United States Patent
Bansal et al.

(10) Patent No.: US 10,838,420 B2
(45) Date of Patent: Nov. 17, 2020

(54) VEHICULAR PSM-BASED ESTIMATION OF PEDESTRIAN DENSITY DATA

(71) Applicant: TOYOTA JIDOSHA KABUSHIKI KAISHA, Toyota-shi, Aichi-ken (JP)

(72) Inventors: Gaurav Bansal, Mountain View, CA (US); Hongsheng Lu, Mountain View, CA (US); John Kenney, Mountain View, CA (US)

(*) Notice: Subject to any disclaimer, the term of this patent is extended or adjusted under 35 U.S.C. 154(b) by 0 days.

(21) Appl. No.: 15/644,188

(22) Filed: Jul. 7, 2017

(65) Prior Publication Data

US 2019/0011925 A1 Jan. 10, 2019

(51) Int. Cl.
  G05D 1/02 (2020.01)
  G05D 1/00 (2006.01)
  (Continued)

(52) U.S. Cl.
  CPC ......... *G05D 1/0214* (2013.01); *G05D 1/0088* (2013.01); *G06Q 30/0201* (2013.01);
  (Continued)

(58) Field of Classification Search
  CPC .............. G05D 1/0214; G05D 1/0088; G06Q 30/0201; G08G 1/0137
  See application file for complete search history.

(56) References Cited

U.S. PATENT DOCUMENTS

| | | | |
|---|---|---|---|
| 8,509,982 B2 | 8/2013 | Montemerlo et al. | |
| 8,686,832 B2 * | 4/2014 | Oliveira | H04W 4/029 340/8.1 |

(Continued)

FOREIGN PATENT DOCUMENTS

| | | |
|---|---|---|
| JP | 2006-277144 | 10/2006 |
| JP | PO2008-217429 | 9/2008 |

(Continued)

OTHER PUBLICATIONS

USPTO, Non-final Office Action for U.S. Appl. No. 15/640,352, dated Jan. 25, 2019, 39 pages.

(Continued)

*Primary Examiner* — Nicholas Kiswanto

(74) *Attorney, Agent, or Firm* — Burbage Law, P.C.; Jon-Michael Burbage; Elizabeth Ruzich

(57) ABSTRACT

The disclosure includes embodiments for estimating pedestrian density data based on one or more Personal Safety Messages (PSM message). A method includes, according to some embodiments, receiving, by a first dedicated short range communication (DSRC) chip of a DSRC-enabled vehicle, a PSM message including an instance of pedestrian safety message data (PSM data) describing a geographic location of a pedestrian. The method includes executing an analysis of the instance of PSM data to determine that the pedestrian is present at a business based on the geographic location being within a known geographic area for the business. In some embodiments, this analysis is executed for a plurality of instances of PSM data. The method includes generating pedestrian density data for the business that describes how many pedestrians are present at the business based on executing the analysis for the plurality of instances of PSM data.

20 Claims, 10 Drawing Sheets

(51) Int. Cl.
*G08G 1/01* (2006.01)
*G06Q 30/02* (2012.01)
*G08G 1/0967* (2006.01)
*G08G 1/005* (2006.01)

(52) U.S. Cl.
CPC ......... *G06Q 30/0205* (2013.01); *G08G 1/005* (2013.01); *G08G 1/0137* (2013.01); *G08G 1/096708* (2013.01)

(56) References Cited

U.S. PATENT DOCUMENTS

| | | | | |
|---|---|---|---|---|
| 9,505,412 | B2 * | 11/2016 | Bai | G08B 21/06 |
| 9,786,178 | B1 * | 10/2017 | Bai | G08G 1/166 |
| 9,805,592 | B2 * | 10/2017 | Ibrahim | G08G 1/005 |
| 9,870,703 | B2 * | 1/2018 | MacNeille | G08G 1/005 |
| 9,919,648 | B1 * | 3/2018 | Pedersen | G06N 5/048 |
| 10,080,124 | B2 * | 9/2018 | Tan | H04W 4/80 |
| 2009/0312889 | A1 * | 12/2009 | Krupadanam | B60W 20/11 |
| | | | | 701/1 |
| 2015/0202770 | A1 | 7/2015 | Patron et al. | |
| 2016/0049079 | A1 | 2/2016 | Ibrahim et al. | |
| 2017/0192637 | A1 * | 7/2017 | Ren | G06F 3/04817 |
| 2017/0248434 | A1 * | 8/2017 | Best | H04N 7/185 |
| 2017/0292844 | A1 * | 10/2017 | Spiro | G01C 21/3492 |
| 2018/0096605 | A1 | 4/2018 | Bai et al. | |
| 2018/0197419 | A1 * | 7/2018 | Li | G01C 21/3492 |
| 2018/0227270 | A1 * | 8/2018 | Zhang | H04L 61/6022 |
| 2018/0328752 | A1 * | 11/2018 | Tomatsu | G01C 21/3658 |
| 2018/0341261 | A1 * | 11/2018 | Kislovskiy | G01C 21/3438 |
| 2019/0005820 | A1 | 1/2019 | Bansal et al. | |

FOREIGN PATENT DOCUMENTS

| | | |
|---|---|---|
| JP | 2010-69910 | 4/2010 |
| JP | 2015-32312 | 2/2015 |
| JP | PO2015-109003 | 6/2015 |
| JP | 2017-107463 | 6/2017 |
| WO | 2017003622 | 1/2017 |

OTHER PUBLICATIONS

JPO, Notice of Reason for Rejection for Japanese Patent Application No. 2018-118921, dated May 21, 2019, 3 pages.

* cited by examiner

PSM DATA 195

Part 1

GPS Data for the DSRC-enabled device (local 3D), i.e., the device GPS data 188
- Latitude for the DSRC-enabled device substantially at the time when the PSM message is transmitted
- Longitude for the DSRC-enabled device substantially at the time when the PSM message is transmitted
- Elevation for the DSRC-enabled device substantially at the time when the PSM message is transmitted
- Positional accuracy for the latitude, longitude and elevation information
- Day and time when the latitude, longitude and elevation information where determined Path History Data for the DSRC-enabled device
- Historical GPS Data including all the information described above for past times

Part 2
- Path prediction for a pedestrian over a specified time frame or distance
- Group size for the pedestrian (e.g., how many pedestrians are traveling together as a group based on head count?)
- Group radius for the pedestrian (e.g., for a group of pedestrians traveling together, how big is the radius of the group as they walk together? Groups that are less densely packed together will have a bigger radius. Groups that are more densely packed together will have a smaller radius. Groups with more people by headcount will tend to have a larger radius. Groups that have less people by headcount will tend to have a smaller radius.)
- Estimate of whether the pedestrian is pushing a stroller
- Estimate of whether the pedestrian has intent to cross a roadway
- Whether the pedestrian is currently crossing a roadway
- Estimate of whether the pedestrian is traveling with an animal and the type of animal with the pedestrian
- Estimate of the non-vehicular means of propulsion of the pedestrian (e.g., bike, scooter, skateboard, etc)

VEHICULAR PSM-BASED ESTIMATION OF PEDESTRIAN DENSITY DATA

BACKGROUND

The specification relates to personal safety messages ("PSM message" if singular, or "PSM messages" if plural). In particular, the specification relates to vehicular PSM-based estimation of pedestrian density data.

Different businesses have different patterns of customer activity. For example, a grocery store may be busiest when commuters are heading home from work (e.g., 5:00 PM), whereas a bar or nightclub may be busiest after dark (e.g., 9:00 PM to 2:00 AM).

Vehicle control systems are becoming increasingly popular. One example of a vehicle control system is an Advanced Driver Assistance System ("ADAS system" if singular, "ADAS systems" if plural).

ADAS systems provide one or more autonomous features to the vehicles which include these ADAS systems. For example, an ADAS system may monitor the position of a vehicle relative to the lane in which the vehicle is traveling, and if the vehicle begins to swerve outside of that lane the ADAS system may take remedial action by repositioning the vehicle so that the vehicle stays in the lane or providing a notification to a driver of the vehicle so that the driver knows that they need to take action to remedy the situation.

Some vehicles include a sufficient number and quality of autonomous features that they are considered to be autonomous vehicles.

Autonomous vehicles will need to account for different patterns of customer activity at businesses so that they can adapt their behavior accordingly. For example, an autonomous vehicle may travel with more caution when it is near a business that is experiencing peak business hours relative to how the autonomous vehicle may travel when it is near a business that is closed.

SUMMARY

The Dedicated Short Range Communication ("DSRC") standard specifies the requirements for a vehicle to be a "DSRC-enabled vehicle." For example, a DSRC-enabled vehicle is any type of connected vehicle including a DSRC chip, a DSRC-compliant GPS unit and any other hardware or software which is necessary to comply with the DSRC standard as applied to vehicles.

The DSRC standard also specifies the requirements for an electronic device which is not a vehicle to be a "DSRC-enabled device." For example, a DSRC-enabled device is any type of processor-based computing device which is not a vehicle and includes a DSRC chip, a DSRC-compliant GPS unit and any other hardware or software which is necessary to comply with the DSRC standard as applied to non-vehicular devices. In some embodiments, one or more of the following are a DSRC-enabled device if they include a DSRC chip: a smartphone; a tablet computer; a laptop; a smartwatch; a fitness band; etc.

In some embodiments, a DSRC-enabled device is carried by a pedestrian. A pedestrian includes a human that is located in a roadway environment or proximate to a roadway.

In some embodiments, a DSRC-enabled device broadcasts or unicasts one or more Pedestrian Safety Messages ("PSM message" if singular, "PMS messages" if plural). A PSM message includes PSM data (see, e.g., FIG. 1B). In some embodiments, the specification relates to a pedestrian density system that determines pedestrian density data that describes a number of pedestrians present at a business for different times of day and days of week based on the PSM data included in one or more PSM messages.

In some embodiments, a PSM message is transmitted by a DSRC-enabled device when the DSRC-enabled device is located in a roadway environment or proximate to a roadway (e.g., within 500 meters of a roadway, which corresponds to the transmission range of PSM messages based on the requirements of the DSRC standard). Over a period of time, the PSM data aggregated from a plurality of PSM messages for a specific geographic location on different days and times are analyzed to determine the number of pedestrians located at that specific geographic location on different days of the week and different times of the day.

In some embodiments, the PSM data can also be analyzed to determine metrics about these pedestrians present at the specific geographic location on different days of the week and different times of the day. For example, the PSM data is analyzed by the pedestrian density system to determine one or more of the following: a distribution of genders of the pedestrians at the specific geographic location on different days of the week and different times of the day; a distribution of ages of the pedestrians at the specific geographic location on different days of the week and different times of the day; a distribution of income levels of the pedestrians at the specific geographic location on different days of the week and different times of the day; information about the shopping habits/preferences for the pedestrians at the specific geographic location on different days of the week and different times of the day; etc. See, e.g., FIG. 5B.

In some embodiments, a DSRC-enabled vehicle includes a set of ADAS systems. The set of ADAS systems control the motion profile of the DSRC-enabled vehicle. A set of ADAS systems may be referred to herein as an "ADAS system set." See, e.g., the ADAS system set 180 depicted in FIG. 1A. In some embodiments, the pedestrian density data is used by the set of ADAS systems to modify a motion profile of a DSRC-enabled vehicle based on the number of pedestrians present at a nearby location as indicated by the pedestrian density data.

In some embodiments, the pedestrian density system forms or modifies an electronic roadway map including or associated with pedestrian density data for different geographic locations. See, e.g., FIG. 1D, which includes an example of an electronic roadway map according to some embodiments. FIG. 5A includes an example of an instance of pedestrian density data for a particular business or geographic location.

The design time for generating pedestrian density data is now described according to some embodiments. A plurality of DSRC-enabled devices broadcast a plurality of PSM messages for one or more geographic locations. For example, a plurality of pedestrians have their DSRC-enabled smartphones and these DSRC-enabled smartphones repeatedly broadcast PSM messages at a regular interval so long as the DSRC-enabled smartphones are within 500 meters of a roadway, which is the transmission range for PSM messages based on the DSRC standard. In some embodiments, the DSRC-enabled smartphones broadcast the PSM messages regardless of whether they are within 500 meters of a roadway or any other similar triggering mechanism. In some embodiments, the PSM messages are unicast instead of broadcast.

In some embodiments, the DSRC-enabled vehicle receives the plurality of PSM messages. The DSRC-enabled vehicle includes a pedestrian density system which extracts the PSM data from the plurality of PSM messages and stores the PSM data in a non-transitory memory of the DSRC-enabled vehicle (see, e.g., the memory 227 depicted in FIG. 2).

In some embodiments, the pedestrian density system causes a communication unit of the DSRC-enabled vehicle to transmit a wireless message to a server via a wireless network. The wireless message includes the PSM data which is stored in the non-transitory memory of the DSRC-enabled vehicle.

In some embodiments, the server includes a version of the pedestrian density system. In some embodiments, the version of the pedestrian density system included on the server is operable to perform different or additional tasks relative to the version of the pedestrian density system included in the DSRC-enabled vehicle. In other embodiments, the pedestrian density system included in the server is the same as that included in the DSRC-enabled vehicle, but the tasks performed by the different pedestrian density systems varies based on whether it is installed in the DSRC-enabled vehicle or the server. In this way, the tasks of the pedestrian density system are distributed across multiple endpoints of an operating environment (e.g., the operating environment 100 of FIG. 1A) in some embodiments. In some embodiments, the pedestrian density system 199 of the DSRC-enabled vehicle provides all the functionality described below for the pedestrian density system of the server such that the server, as well as the step of the communication unit of the DSRC-enabled vehicle transmitting the wireless message to the server including the PSM data, is not included these embodiments. See, e.g., FIGS. 3A and 3B which do not include the pedestrian density system of the server in some embodiments.

In some embodiments, the pedestrian density system aggregates PSM data received from many different DSRC-enabled vehicles to form an aggregated PSM data structure. The aggregated PSM data structure includes a plurality of instances of PSM data for many different geographic locations at many different times of day and days of the week. Instances of PSM data include device graphical positioning system data ("device GPS data") that describes the geographical position for the DSRC-enabled devices which initially broadcast or unicast the PSM message that included the instance of PSM data. The device GPS data for a particular instance of PSM data describes the geographical position of the DSRC-enabled device (as well as the pedestrian caring the DSRC-enabled device) at the time when the PSM message is transmitted.

In some embodiments, the pedestrian density system includes an electronic roadway map that includes business graphical positioning system data ("business GPS data") for a plurality of businesses. The business GPS data for a particular business describes a geographical area occupied by that particular business, and this geographical area can include a plurality geographical points which correspond to a plurality of instances of device GPS data at any given time since the geographical area occupied by a business is greater than the geographical area occupied by a combination of latitude and longitude which is described by the device GPS data. See, e.g., FIG. 1C.

In some embodiments, the pedestrian density system analyzes (1) the device GPS data included in the PSM data of the aggregated PSM data structure and (2) the business GPS data of the electronic roadway map to identify matches between the device GPS data and the business GPS data. For example, a match occurs if a particular instance of device GPS data indicates a geographic location that corresponds to a location within the geographic area occupied by a particular business as described by the business GPS data. This match indicates that a pedestrian is present at the business on a particular day and time described by the PSM data which included the device GPS data. For some instances of PSM data, a match is not found by this analysis if the device GPS data does not correspond to a latitude and longitude that is included in the geographic area occupied by a particular business as described by the business GPS data. This analysis is repeated by the pedestrian density system for the unanalyzed instances of PSM data included in the aggregated PSM data structure to generate a plurality of instances of pedestrian density data. An instance of pedestrian density data describes a total number of pedestrians present at a particular business on different times of day and days of the week as identified by the analysis described in this paragraph. In some embodiments, an instance of pedestrian density data describes other information as indicated in FIGS. 5A and 5B.

In some instances, for some embodiments, because the PSM messages are broadcast in a repeated fashion in some embodiments, there will be duplicate entries of PSM data for a particular pedestrian at a particular business on a particular day and time. However, the instances of PSM data includes various types of metadata (e.g., path history data, path prediction data, group size data, group radius data, etc.) that can be analyzed by the pedestrian density system to identify duplicate entries which are then discounted from the total number of pedestrians described by the plurality of instances of pedestrian density data. For example, the pedestrian density system analyses the PSM data included in the aggregated PSM data structure to identify a commonality across a plurality of the different metadata for two or more instances of PSM data, and this commonality is indicative of a duplicate entry which needs to be either deleted or discounted from the total pedestrian count described by the pedestrian density data. In this way, the pedestrian density data is made more accurate by identifying and eliminating duplicate entries for particular pedestrians.

In some embodiments, other approaches are used to eliminate duplicate entries of PSM data for a particular pedestrian at a particular business on a particular day and time. For example, unique identifiers are assigned by the pedestrian density system to the different instances of PSM data based on the different DSRC-enabled devices which originated these instances of PSM data, and these unique identifiers are used to identify and eliminate duplicate entries of PSM data for a particular pedestrian at a particular business on a particular day and time. In another example, unique identifiers are assigned to each DSRC-enabled device which originates instances of PSM data, and these unique identifiers are then associated with each instance of PSM data originated by these DSRC-enabled devices, and subsequently used to identify and eliminate duplicate entries of PSM data for a particular pedestrian at a particular business on a particular day and time. In some embodiments, each DSRC-enabled device includes identifying data in each PSM message which is used by the pedestrian density system to identify and eliminate duplicate entries of PSM data for a particular pedestrian at a particular business on a particular day and time.

In some embodiments, the steps taken to identify and eliminate duplicate entries of PSM data for a particular pedestrian at a particular business on a particular day and time include the application of anonymization techniques such that the identify of particular pedestrians is not capable of ascertaining based on the data that is stored by the pedestrian density system.

In some embodiments, an instance of pedestrian density data describes one or more of the following: (1) the business GPS data for the business which matched the device GPS data for the PSM data used to generate this instance of pedestrian density data; (2) time data describing different days of the week and the times of day described by this instance of pedestrian density data based on the times of day and days of the week described by the PSM data used to generate this instance of pedestrian density data; (3) count data describing a number of pedestrians present at the business for different days of the week and times of the day; (4) gender variations present among pedestrians at the business at different days of the week and times of the day described by the time data [e.g., of the "N" number of pedestrians present at this "B" business at "T" time of day and "D" day of the week, "X" are women and "Y" are men, where N, B, T, D, X and Y are variables in the pedestrian density data]; (5) age variations among pedestrians present at the business at this day of the week and time of the day described by the time data; (6) parental status of the pedestrians present at the business at this day of the week and time of the day described by the time data [e.g., an estimate of whether they are a parent of a young child as estimated by whether they are pushing a stroller]; and (7) any other metrics which are determinable based on the PSM data. See, e.g., FIGS. 1B, 5A and 5B.

In some embodiments, the processes described above are repeated as new PSM messages are received so that the pedestrian density data is updated and kept fresh.

Example uses of the pedestrian density data at a runtime are now described. In some embodiments, the pedestrian density system associates the plurality of instances of pedestrian density data with the business GPS data included in the electronic roadway map for these different businesses. See, e.g., FIG. 1D. In this way, the pedestrian density data for a particular business is retrievable at a runtime using the electronic roadway map.

In some embodiments, the electronic roadway map includes directory data about the businesses such as their hours of operation, their business type (e.g., restaurant, bar, gas station, etc.), variations in the services they sell (e.g., cuisine type, a general category of the products sold, a general category of the services sold, etc.), etc. such that the electronic roadway map and the pedestrian density data can be used, alone or in combination, by an electronic personal assistant of the DSRC-enabled vehicle to respond to queries. For example, a driver of the DSRC-enabled vehicle may ask their electronic personal assistant a question such as "What restaurants are open now that serve Mexican cuisine and are not too busy?" In this example, the electronic roadway map may include directory data and pedestrian density data that assists the electronic personal assistant to respond to this query. For example, the directory data describes what services the business sells (i.e., a restaurant), what type of cuisine it provides (i.e., Mexican) and its hours of operation. Also in this example, the pedestrian density data beneficially provided by the pedestrian density system describes a number of customers present at the business as indicated on real-time or historical PSM data.

In some embodiments, the directory data for a particular business describes directory information about the business such as, for example: the name of the business; its hours of operation; whether it is presently closed or open; what the business sells; a menu of goods or services sold by the business; reviews for the business; similar businesses; the address for the business; the phone number for the business; the universal resource locator for a website of the business; other nearby businesses; an image of the storefront of the business; etc.

In some embodiments, the pedestrian density data is retrieved at a runtime by the pedestrian density system and provided to the ADAS systems of a DSRC-enabled vehicle as the geographic location of the DSRC-enabled vehicle changes so that the ADAS systems of the DSRC-enabled vehicle modify the motion profile of the DSRC-enabled vehicle to correspond to the number of pedestrians present at the businesses proximate to the current geographic location of the DSRC-enabled vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving, by a first DSRC chip of a DSRC-enabled vehicle, a PSM message including an instance of PSM data describing a geographic location of a pedestrian; executing an analysis of the instance of PSM data to determine that the pedestrian is present at a business based on the geographic location being within a known geographic area for the business; and generating pedestrian density data for the business that describes how many pedestrians are present at the business based on executing the analysis for a plurality of instances of PSM data. Other embodiments of this aspect include corresponding computer systems, apparatus, and computer programs recorded on one or more computer storage devices, each configured to perform the actions of the methods.

Implementations may include one or more of the following features. The method where the instance of PSM data further describes a time of day and a day of week when the pedestrian is present at the geographic location, and the pedestrian density data for the business describes how many pedestrians are present at the business for different times of day and different days of the week. The method further including the DSRC-enabled vehicle wirelessly transmitting the PSM data to a server which determines the pedestrian density data and wirelessly transmits the pedestrian density data back to the DSRC-enabled vehicle. The method where the DSRC-enabled vehicle is an automated vehicle. The method where the PSM message is broadcast by a DSRC-enabled device which is carried by the pedestrian and includes a second DSRC chip that is operable to broadcast the PSM message via DSRC for the receiving by the first DSRC chip. The method further including: determining that a current geographic location of the DSRC-enabled vehicle is within a threshold distance of a geographic location of the business; and modifying an operation of a set of ADAS systems of the DSRC-enabled vehicle based on the pedestrian density data for the business so that a motion profile of the DSRC-enabled vehicle is modified for how many pedestrians are present at the business. The method further including: receiving, by an electronic personal assistant of the DSRC-enabled vehicle, a query related to a business; and responding to the query based at least in part on the pedestrian density data for the business. Implementations of the described techniques may include hardware, a method or process, or computer software on a computer-accessible medium.

One general aspect includes a system including: a processor and a first DSRC chip of a DSRC-enabled vehicle communicatively coupled to a non-transitory memory storing executable code which is operable, when executed by the processor, to cause the processor to: receive, by the first DSRC chip, a PSM message including an instance of PSM data describing a geographic location of a pedestrian; execute an analysis of the instance of PSM data to determine that the pedestrian is present at a business based on the geographic location being within a known geographic area for the business; and generate pedestrian density data for the business that describes how many pedestrians are present at the business based on executing the analysis for a plurality of instances of PSM data. Other embodiments of this aspect include corresponding computer systems, apparatus, and computer programs recorded on one or more computer storage devices, each configured to perform the actions of the methods.

Implementations may include one or more of the following features. The system where the instance of PSM data further describes a time of day and a day of week when the pedestrian is present at the geographic location, and the pedestrian density data for the business describes how many pedestrians are present at the business for different times of day and different days of the week. The system further including the DSRC-enabled vehicle wirelessly transmitting the PSM data to a server which determines the pedestrian density data and wirelessly transmits the pedestrian density data back to the DSRC-enabled vehicle. The system where the DSRC-enabled vehicle is an automated vehicle. The system where the PSM message is broadcast by a DSRC-enabled device which is carried by the pedestrian and includes a second DSRC chip that is operable to broadcast the PSM message via DSRC for receipt by the first DSRC chip. The system where the non-transitory memory stores additional executable code which is operable, when executed by the processor, to cause the processor to: determine that a current geographic location of the DSRC-enabled vehicle is within a threshold distance of a geographic location of the business; and modify an operation of a set of ADAS systems of the DSRC-enabled vehicle based on the pedestrian density data for the business so that a motion profile of the DSRC-enabled vehicle is modified for how many pedestrians are present at the business. The system where the non-transitory memory stores additional executable code which is operable, when executed by the processor, to cause the processor to: receive, by an electronic personal assistant of the DSRC-enabled vehicle, a query related to a business; and respond to the query based at least in part on the pedestrian density data for the business. Implementations of the described techniques may include hardware, a method or process, or computer software on a computer-accessible medium.

One general aspect includes a computer program product including a non-transitory memory of an onboard vehicle computer system of a DSRC-enabled vehicle storing computer-executable code that, when executed by the onboard vehicle computer system, causes the onboard vehicle computer system to: receive, by a first DSRC chip of a DSRC-enabled vehicle, a PSM message including an instance of PSM data describing a geographic location of a pedestrian; execute an analysis of the instance of PSM data to determine that the pedestrian is present at a business based on the geographic location being within a known geographic area for the business; and generate pedestrian density data for the business that describes how many pedestrians are present at the business based on executing the analysis for a plurality of instances of PSM data. Other embodiments of this aspect include corresponding computer systems, apparatus, and computer programs recorded on one or more computer storage devices, each configured to perform the actions of the methods.

Implementations may include one or more of the following features. The computer program product where the instance of PSM data further describes a time of day and a day of week when the pedestrian is present at the geographic location, and the pedestrian density data for the business describes how many pedestrians are present at the business for different times of day and different days of the week. The computer program product further including the DSRC-enabled vehicle wirelessly transmitting the PSM data to a server which determines the pedestrian density data and wirelessly transmits the pedestrian density data back to the DSRC-enabled vehicle. The computer program product where the PSM message is broadcast by a DSRC-enabled device which is carried by the pedestrian and includes a second DSRC chip that is operable to broadcast the PSM message via DSRC for receipt by the first DSRC chip. The computer program product where the non-transitory memory stores additional computer-executable code which is operable, when executed by the onboard vehicle computer system, to cause the onboard vehicle computer system to: determine that a current geographic location of the DSRC-enabled vehicle is within a threshold distance of a geographic location of the business; and modify an operation of a set of ADAS systems of the DSRC-enabled vehicle based on the pedestrian density data for the business so that a motion profile of the DSRC-enabled vehicle is modified for how many pedestrians are present at the business. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1B is a block diagram illustrating an example of PSM data according to some embodiments.

DETAILED DESCRIPTION

Figure 1A:
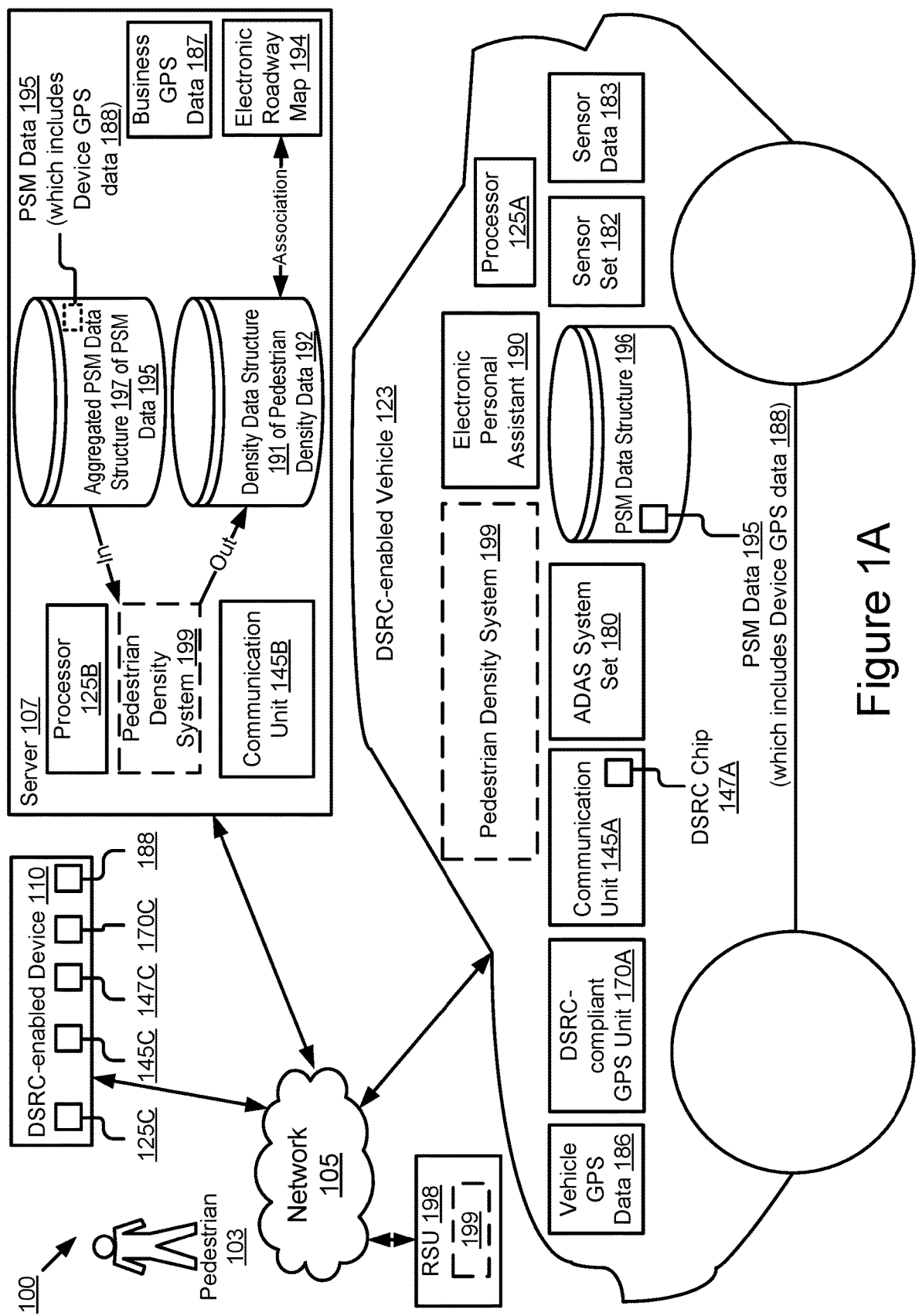
FIG. 1A is a block diagram illustrating an operating environment for a pedestrian density system according to some embodiments.

A DSRC-enabled device is a processor-based mobile computing device that includes a DSRC chip and a communication unit, and is operable to transmit PSM messages at regular intervals. Each PSM message includes PSM data (see, e.g., FIG. 1B).

In some embodiments, the DSRC-enabled device only transmits a PSM message if it is within 500 meters of a roadway. The DSRC-enabled device determines that it is within 500 meters of the roadway based on the geographic location of the DSRC-enabled device which is determined using a DSRC-compliant GPS unit which is also an element of the DSRC-enabled device in some embodiments. In some embodiments, the DSRC-enabled device transmits the PSM messages regardless of whether it is within 500 meters of the roadway.

In another embodiment, the DSRC-enabled device includes data describing geographic locations for different businesses or locations, and the DSRC-enabled device only transmits a PSM message when the DSRC-enabled device is within one of these businesses or locations based on the GPS data provided by the DSRC-compliant GPS unit included in the DSRC-enabled device.

In some embodiments, the PSM message is broadcasted by the DSRC chip of the DSRC-enabled device. In some embodiments, the PSM message is unicast by the DSRC chip of the DSRC-enabled device.

A DSRC-enabled vehicle is a connected vehicle that includes the DSRC chip and the DSRC-compliant GPS unit. A DSRC-enabled device is not a DSRC-enabled vehicle because a DSRC-enabled device is not a vehicle. The DSRC chip and the DSRC-compliant GPS unit included in each of the DSRC-enabled vehicle and the DSRC-enabled device are similar to one another but may vary based on size since a DSRC-enabled vehicle is generally bigger than a DSRC chip, and so, cost savings may be achieved by making these components of the DSRC-enabled vehicle bigger than those of the DSRC-enabled device.

In some embodiments, a DSRC chip is an electronic hardware device that includes: (1) a DSRC transmitter that is operable to lawfully transmit DSRC messages; (2) a DSRC receiver that is operable to lawfully receive DSRC messages; and (3) any other hardware or software that is necessary for the DSRC-enabled vehicle or the DSRC-enabled device to comply with the DSRC standard. It will be understood to those having ordinary skill in the art that a device which is merely able to transmit and receive cellular communications, Wi-Fi communications or millimeter wave communications is not a DSRC chip, or otherwise "DSRC-enabled," because such devices are not built for mobility and do not comply with the DSRC standard (for example, among many other requirements, receive and transmit messages exclusively on the 5.9 GHz band), and as such, are not able to transmit or receive DSRC messages.

A DSRC message is a wireless message that is specially configured to be send and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it is transmitted in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, the DSRC-compliant GPS unit includes hardware that wirelessly communicates with a GPS satellite to retrieve positional data (herein, GPS data, "DSRC-compliant GPS data," "vehicle GPS data" when referring to a geographical location of a DSRC-enabled vehicle or "device GPS data" when referring to a geographical location of a DSRC-enabled device) that describes a location of the DSRC-enabled vehicle or the DSRC-enabled device, as the case may be, with a precision that is compliant with the DSRC standard. The DSRC standard requires that positional data be accurate to within plus or minus 1.5 meters at least 68% of the time when the DSRC-compliant GPS unit is under an open sky. For example, the DSRC standard requires that positional information generated by the DSRC-compliant GPS unit be precise enough to infer if two vehicles (one of which is, for example, the DSRC-enabled vehicle 123 depicted in FIG. 1A) are in the same lane at the same time. The lane may be a lane of a roadway. The DSRC-compliant GPS unit is operable to identify, monitor and track its two-dimensional position within 1.5 meters of its actual position 68% of the time under an open sky. Since lanes of a roadway are typically no less than 3 meters wide, the positional information generated by the DSRC-compliant GPS unit describes it's position (as well as the position of the DSRC-enabled vehicle or DSRC-enabled device which includes the DSRC-compliant GPS unit) with lane-level accuracy.

In some embodiments, a DSRC-enabled device also includes a DSRC-compliant GPS unit, and as such, is also able retrieve DSRC-compliant GPS data that describes the location of the DSRC-enabled device (and by extension, the location of the pedestrian who is carrying the DSRC-enabled device) with an accuracy of plus or minus 1.5 meters. This accuracy is beneficial, for example, since it helps the DSRC chip of the DSRC-enabled device to generate PSM messages that includes device GPS data that is accurate enough to determine which business the pedestrian and the DSRC-enabled device are located in at the time when the PSM messages are transmitted by the DSRC chip.

By comparison, a conventional GPS unit which is not compliant with the DSRC standard is unable to determine positional information with lane-level accuracy. For example, a typical lane of a roadway is approximately 3 meters wide. However, a conventional GPS unit only has an accuracy of plus or minus 10 meters relative to the actual location of the conventional GPS unit. As a result, such conventional GPS units are not sufficiently accurate for use by the pedestrian density data being erroneous in terms of the geographic locations it describes, which would eventual result in a vehicle traveling with an inappropriate motion profile relative to its current location of travel, which might cause death or injury for pedestrians which are in the vicinity of the vehicle.

In some embodiments, the DSRC standard is described in one or more of the following standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

Referring to FIG. 1A, depicted is a block diagram illustrating an operating environment 100 for a pedestrian density system 199 according to some embodiments. The operating environment 100 may include one or more of the DSRC-enabled vehicle 123, a server 107, a roadside unit 198 (a "RSU" 198 if singular, or "RSUs" 198 if plural) and a DSRC-enabled device 110. These elements may be communicatively coupled to one another via a network 105. Although one DSRC-enabled vehicle 123, one server 107, one DSRC-enabled device 110, one RSU 198 and one network 105 are depicted in FIG. 1A, in practice the operating environment 100 may include one or more DSRC-enabled vehicles 123, one or more servers 107, one or more DSRC-enabled devices 110, one or more RSUs 198 and one or more networks 105. The operating environment 100 may also include a pedestrian 103.

The pedestrian density system 199 is depicted in dashed lines in FIG. 1A as an element of the DSRC-enabled vehicle 123, the server 107 and the RSU 198 to indicate that each of these devices may include a pedestrian density system 199 and that the functionality of the pedestrian density system 199 may be distributed across a plurality of different devices of the operating environment 100.

In some embodiments, a pedestrian 103 includes a human that is carrying the DSRC-enabled device 110. For example, the pedestrian 103 has the DSRC-enabled device 110 in their hand, in their pocket or placed on a surface top that is nearby (e.g., a table top, a bar top or some other surface top). Accordingly, the word "carrying" as used herein with reference to the pedestrian 103 carrying the DSRC-enabled device does not require the pedestrian 103 to be actually holding the DSRC-enabled device 110 at all times.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols.

In some embodiments, the network 105 includes a DSRC network operable to transmit or broadcast DSRC messages, including PSM messages. In some embodiments, a PSM message is a DSRC message that is broadcast (instead of unicast) and whose payload consists of PSM data 195. In other words, the payload of the PSM message includes only PSM data 195 and no other payload.

In some embodiments, the network 105 is a full-duplex network operable to send full-duplex wireless communications. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

The network 105 may include one or more communication channels shared among the DSRC-enabled vehicle 123, the server 107, the RSU 198 and the DSRC-enabled device 110. The communication channel may include one or more of DSRC, LTE vehicle to everything (V2X), full-duplex wireless communication or any other wireless communication protocol. For example, the network 105 may be used by the DSRC-enabled device 110 to broadcast a PSM message which is received by the DSRC-enabled vehicle 123. In another example, the network 105 is used by the DSRC-enabled vehicle 123 (or, optionally, the RSU 198) to transmit a wireless message including PSM data 195 to the server 107. In another example, the network 105 is used by the server 107 to transmit a wireless message including pedestrian density data 192 to the DSRC-enabled vehicle 123 (or, optionally, the RSU 198 which then transmits the pedestrian density data 192 to the DSRC-enabled vehicle 123).

The DSRC-enabled vehicle 123 is any type of connected vehicle including a DSRC chip 147A, a DSRC-compliant GPS unit 170 and any other hardware or software which is necessary to comply with the DSRC standard as applied to vehicles. For example, the DSRC-enabled vehicle 123 is one of the following types of DSRC-enabled vehicles 123: a car; a truck; a sports utility vehicle; a bus; a semi-truck; a drone or any other roadway-based conveyance. The DSRC-enabled vehicle 123 includes any hardware or software necessary to send and receive wireless messages via the network 105. For example, the DSRC-enabled vehicle 123 includes a communication unit 145A which includes any hardware or software necessary to send and receive wireless messages via the network 105.

Figure 2:
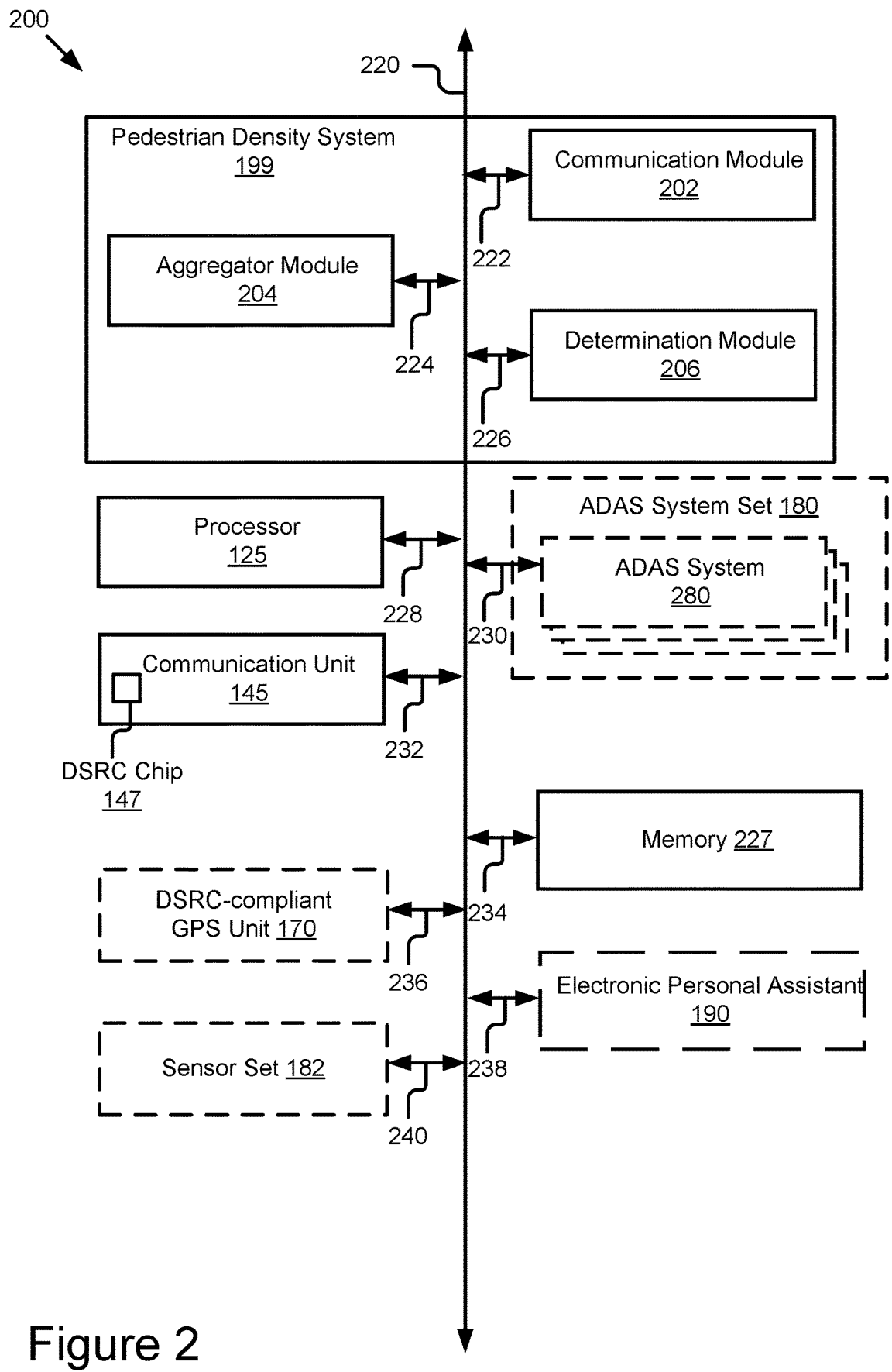
FIG. 2 is a block diagram illustrating an example computer system including the pedestrian density system according to some embodiments.

In some embodiments, the DSRC-enabled vehicle 123 is an autonomous vehicle. For example, the DSRC-enabled vehicle 123 is one of the following: a Level 1 autonomous vehicle; a Level 2 autonomous vehicle; a Level 3 autonomous vehicle; a Level 4 autonomous vehicle; and a Level 5 autonomous vehicle. In some embodiments, the DSRC-enabled vehicle 123 is an HAV. An HAV is an autonomous vehicle whose ADAS system set 180 provides autonomous functionality sufficient to operate at Level 3 or greater. An example of an onboard vehicle computer for the DSRC-enabled vehicle 123 is depicted in FIG. 2 according to some embodiments. For example, the computer system 200 depicted in FIG. 2 is an onboard vehicle computer for the DSRC-enabled vehicle 123 in some embodiments.

The server 107 is a processor-based computing device. For example, the server 107 may include one or more of the following types of processor-based computing devices: a personal computer; a laptop; a mainframe; or any other processor-based computing device that is operable to function as a server. The server 107 may include a hardware server. The server 107 includes any hardware or software necessary to send and receive wireless messages via the network 105.

The DSRC-enabled device 110 is a processor-based mobile computing device including a DSRC chip 147C and any other hardware or software which is necessary to comply with the DSRC standard as applied to mobile computing devices which are not vehicles or conveyances. For example, the DSRC-enabled device 110 may include one or more of the following types of processor-based computing devices so long as these devices also include a DSRC chip 147C and any other hardware or software which is necessary to comply with the DSRC standard: a smartphone; a smartwatch; an augmented reality viewing device (e.g., augmented reality goggles or glasses); a tablet computer; an electronic book reader; a personal computer; a laptop; and any other processor-based device that is operable to function as mobile computing device. The DSRC-enabled device 110 includes any hardware or software necessary to send and receive wireless messages via the network 105.

In some embodiments, the DSRC-enabled vehicle 123 includes one or more of the following elements: a processor 125A; a communication unit 145A; a DSRC chip 147A; a DSRC-compliant GPS unit 170A; vehicle GPS data 186; the ADAS system set 180; an electronic personal assistant 190; a sensor set 182; sensor data 183; PSM data structure 196; and the pedestrian density system 199.

In some embodiments, the server 107 includes one or more of the following elements: a processor 125B a communication unit 145B; an aggregated PSM data structure 197; a density data structure 191; an electronic roadway map 194 including business GPS data 187; and the pedestrian density system 199.

In some embodiments, the DSRC-enabled device 110 includes: a processor 125C; a communication unit 145C; a DSRC chip 147C; a DSRC-compliant GPS unit 170C; and device GPS data 188. The device GPS data 188 is DSRC-compliant GPS data that describes the geographical location of the DSRC-enabled device 110, and by extension, the pedestrian 103 who is carrying the DSRC-enabled device 110.

The processor 125A of the DSRC-enabled vehicle 123, the processor 125B of the server 107 and the processor 125C of the DSRC-enabled device 110 are referred to herein individually or collectively as "processor 125." For example, the processor 125A of the DSRC-enabled vehicle 123 is referred to individually as "the processor 125," the processor 125B of the server 107 is referred to individually as the "processor 125" and the processor 125C of the DSRC-enabled device 110 is referred to individually as the "processor 125," while the processors 125A, 125B, 125C may be referred to herein collectively as "the processor 125" or "the processors 125."

Similarly, the communication units 145A, 145B, 145C of the DSRC-enabled vehicle 123, the server 107 and the DSRC-enabled device 110, respectively, may be referred to individually as the "communication unit 145," or collectively as the "communication unit 145" or "communication units 145." The DSRC chips 147A, 147C of the DSRC-enabled vehicle 123 and the DSRC-enabled device 110, respectively, may be referred to individually as the "DSRC chip 147," or collectively as the "DSRC chip 147" or "DSRC chips 147." The DSRC-compliant GPS units 170A, 170C of the DSRC-enabled vehicle 123 and the DSRC-enabled device 110, respectively, may be referred to individually as the "DSRC-compliant GPS unit 170," or collectively as the "DSRC-compliant GPS unit 170" or "DSRC-compliant GPS units 170."

Although no "DSRC chip 147B" or "DSRC-compliant GPS unit 170B" is depicted in FIG. 1A, in some embodiments the server 107 includes one or more of a DSRC chip and a DSRC-compliant GPS unit, and in these embodiments these elements are referred to as "the DSRC chip 147B" or "the DSRC-compliant GPS unit 170B," respectively.

Similarly, although the RSU 198 is not depicted as including a processor 125, communication unit 145, DSRC chip 147 or DSRC-compliant GPS unit 170 in FIG. 1A, in some embodiments the RSU 198 includes these elements. For example, in some embodiments the computer system 200 depicted in FIG. 2 is an example of an RSU 198.

In some embodiments, a DSRC chip 147 is an element of a communication unit 145. In other embodiments, a DSRC chip 147 is a stand-alone element or an element of a component which is not the communication unit 145. For example, the DSRC chip 147 may be an element of the DSRC-compliant GPS unit 170.

In some embodiments, the processors 125, the communication units 145, the DSRC chips 147 and the DSRC-compliant GPS units 170 provide similar functionality relative to one another, and so, the descriptions for these elements does not need to be repeated for each of the DSRC-enabled vehicle 123, the server 107, the DSRC-enabled device 110 and, where applicable, the RSU 198. Accordingly, the descriptions of the processor 125, the communication units 145, the DSRC chips 147 and the DSRC-compliant GPS units 170 will now be provided for each of the DSRC-enabled vehicle 123, the server 107, the DSRC-enabled device 110 and, where applicable, the RSU 198.

The processor 125 includes an arithmetic logic unit, a microprocessor, a general-purpose controller, or some other processor array to perform computations and provide electronic signals necessary to provide the functionality of one or more of the DSRC-enabled vehicle 123, the server 107, the DSRC-enabled device 110 and the RSU 198. The processor 125 processes data signals and may include various computing architectures including a complex instruction set computer (CISC) architecture, a reduced instruction set computer (RISC) architecture, or an architecture implementing a combination of instruction sets. One or more of the DSRC-enabled vehicle 123, the server 107, the DSRC-enabled device 110 and the RSU 198 may include one or more processors 125. Other processors, operating systems, sensors, displays, and physical configurations may be possible. In some embodiments, the one or more processors 125 are an element of an onboard vehicle computer, an onboard unit or electronic control unit.

The communication unit 145 transmits and receives data to and from a network 105 or to another communication channel. In some embodiments, the communication unit 145 may include the DSRC chip 147 and other hardware or software necessary to make the element which includes the communication unit 145 be "DSRC-enabled" and compliant with the DSRC standard.

In some embodiments, the communication unit 145 includes a port for direct physical connection to the network 105 or to another communication channel. For example, the communication unit 145 includes a universal serial bus (USB), secure digital (SD), CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

A DSRC chip 147 includes a DSRC antenna. The DSRC antenna includes one or more of a DSRC transceiver and a DSRC receiver. The DSRC chip 147 is operable to send and receive one or more PSM messages. The DSRC transceiver may broadcast or unicast the PSM messages. For example, each PSM message is broadcast by the DSRC transceiver at a regular interval (once every 0.10 seconds) which is configurable by the pedestrian 103 or specified by the DSRC standard. In some embodiments, the DSRC chip 147 may include any other hardware or software necessary to make the element which includes the DSRC chip 147 be "DSRC-enabled" and compliant with the DSRC standard.

In some embodiments, the DSRC chip 147 receives GPS data (e.g., the vehicle GPS data 186 or the device GPS data 188) from the DSRC-compliant GPS unit 170 so that the DSRC chip 147 can enforce a rule that a PSM message is only transmitted when the GPS data indicates that the DSRC chip 147 is within a threshold distance from roadway infrastructure or a roadway.

For example, the threshold distance may be 500 meters (the range for transmitting DSRC messages such as the PSM message), and whether the threshold distance has been met may be determined by the DSRC chip 147 by comparing the GPS data to a roadway infrastructure map stored in a non-transitory memory that is accessible by the DSRC chip 147. The roadway infrastructure map used by the DSRC chip 147 includes digital data that describes different roadway infrastructure and the geographic locations of these different roadway infrastructure. Roadway infrastructure includes, for example: roadways; a parking lot (whether public or private); a parking garage (whether public or private); an airport; sidewalks; mediums; traffic signs; traffic lights; traffic mirrors; cross-walks; public walk-ways; public parks; rest areas; on-ramps; off-ramps; breakdown lanes; roadway median strips; hospital infrastructure related to a roadway; police infrastructure related to a roadway; firefighting infrastructure related to a roadway; and any other component of a roadway or element which is assistive to a roadway. In some embodiments, the roadway infrastructure map is an element of the electronic roadway map 194 and the electronic roadway map 194 is stored in a non-transitory memory that is accessible by the DSRC chip 147A. In some embodiments, the DSRC chip 147 includes code and routines that are operable, when executed by a processor, to execute steps which determine whether the threshold distance is met or exceeded.

In some embodiments, the DSRC chip 147 is licensed by a government (e.g., the United States government, the Japanese government, the German government, a state or province government of a nation such as the United States, Japan, Germany, etc.) to send and receive DSRC messages so that such messages may be lawfully broadcast, unicast or otherwise transmitted and received in a jurisdiction where the DSRC chip 147 is located. For example, in some jurisdictions DSRC messages cannot be lawfully sent or received by a device unless the device which transmits the DSRC message is either licensed to do so or of a type which is permitted to do so under the laws of the jurisdiction (e.g., a first lawful type includes a DSRC-enabled vehicle 123 transmitting a Basic Safety Message and a second lawful type includes a DSRC-enabled device 110 transmitting a PSM message). A Basic Safety Message and a PSM message are both examples of a DSRC message.

In some embodiments, the DSRC chip 147 is operable to broadcast a PSM message at some fixed interval (once every 0.10 seconds, which is an interval suggested by the DSRC standard) that is user configurable (provided, for example, that the DSRC chip 147 is located at a geographical position which meets or is within the position threshold).

In some embodiments, the DSRC-compliant GPS unit 170 is operable to retrieve DSRC-compliant GPS data (e.g., the vehicle GPS data 186, the device GPS data 188 or some other suitable digital data) that includes digital data that describes one or more locations (or positions) of the element which includes the DSRC-compliant GPS unit 170 (e.g., the DSRC-enabled vehicle 123, the DSRC-enabled device 110, or some other element of the operating environment 100) at one or more different times. The time may be specified by a time value based on one or more of the current time of day and current day of week when the DSRC-compliant GPS data is received, which may be contemporaneous to when a PSM message is sent. The time value may be an element of the GPS data. For example, DSRC-compliant GPS data such as the vehicle GPS data 186 or the device GPS data 188 includes digital data that describes the time value. In another example, the DSRC-compliant GPS data may be time-stamped to indicate the time when the DSRC-enabled vehicle 123 was at this particular location. The DSRC-compliant GPS data also describes the latitude and longitude of the element which includes the DSRC-compliant GPS unit 170.

In some embodiments, the DSRC-compliant GPS unit 170 includes any hardware or software necessary to make the element of the operating environment 100 which includes the DSRC-compliant GPS unit 170, or the DSRC-compliant GPS unit 170 itself, compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 170 includes hardware that wirelessly communicates with a GPS satellite to retrieve DSRC-compliant GPS data that describes a location of the element which includes the DSRC-compliant GPS unit 170 with a precision that is compliant with the DSRC standard (e.g., plus or minus 1.5 meters relative to the actual location of the DSRC-compliant GPS unit 170). The DSRC standard requires that GPS data be precise enough to infer if two vehicles (one of which is, for example, the DSRC-enabled vehicle 123) are in the same lane at the same time. The lane may be a lane of a roadway. In some embodiments, the DSRC-compliant GPS unit 170 is operable to identify, monitor and track its two-dimensional position within 1.5 meters of its actual position 68% of the time under an open sky. Since lanes of a roadway are typically no less than 3 meters wide, whenever the two-dimensional error of the DSRC-compliant GPS data is less than 1.5 meters the DSRC-compliant GPS data provided by the DSRC-compliant GPS unit 170 may be analyzed to and determine what lane of the roadway the DSRC-enabled vehicle 123 is traveling in based on the relative positions of two or more different vehicles (one of which is, for example, the DSRC-enabled vehicle 123) on the roadway at the same time. Accordingly, DSRC-compliant GPS data that describes the location of the element which includes the DSRC-compliant GPS unit 170 with a precision that is compliant with the DSRC standard may be referred to herein as having "lane-level accuracy" or "lane-level precision."

In some embodiments, the DSRC-compliant GPS unit 170 is operable to provide DSRC-compliant GPS data describing the location of the element of the operating environment 100 which includes the DSRC-compliant GPS unit 170 with lane-level accuracy. For example, the DSRC-enabled device 110 including the DSRC-compliant GPS unit 170 is in the pocket of a pedestrian 103 who is within a business of a strip mall having many different businesses, and the device GPS data 188 provided by the DSRC-compliant GPS unit 170 describes the location of the pedestrian 103 with an accuracy of plus or minus 1.5 meters such that the device GPS data 188 can be used to accurately identify that the pedestrian 103 is sitting in a particular business of the strip mall.

In the context of the pedestrian density system 199, lane-level accuracy enables the pedestrian density system 199 to more accurately determine pedestrian density data 192 for different geographic locations. Lane-level accuracy is beneficial, for example, because it enables the motion profile of the DSRC-enabled vehicle 123 to be accurately optimized based on this pedestrian density data 192 (for example, the DSRC-enabled vehicle 123 slows down when driving near a night club of the strip mall at 11:00 PM but perhaps not the painting supply store within the same strip mall at 11:00 PM because the painting supply store is closed; the DSRC-enabled vehicle 123 slows down when driving near a night club at 11:00 PM but maybe not a 11:00 AM since the night club is not busy in the morning time; etc.). By contrast, since a conventional GPS unit can only provide positional information with an accuracy of plus or minus 10 meters, such conventional GPS units may not be compatible with some embodiments of the pedestrian density system 199 since positional information from the conventional GPS unit cannot be used to accurately identify the geographic location of the pedestrian 103 within a particular business.

In some embodiments, the DSRC-compliant GPS unit 170 includes functionality to provide navigation assistance to the element which includes the DSRC-compliant GPS unit 170.

In some embodiments, one or more of the processor 125, the communication unit 145, the DSRC chip 147 and the DSRC-compliant GPS unit 170 are elements of an onboard unit.

Although only one or more of the following elements are depicted in FIG. 1A, in practice the operating environment 100 may include one or more of the following elements: the pedestrian 103; the DSRC-enabled device 110; the server 107; the RSU 198; the network 105; and the DSRC-enabled vehicle 123. For example, as described below, in practice a single DSRC-enabled vehicle 123 may receive PSM messages from dozens, hundreds or thousands of different DSRC-enabled devices 110 within a few seconds. For example, a DSRC-enabled vehicle 123 present at a public event with a large crowd (e.g., a concert or sporting event) may receive thousands of different PSM messages from thousands of different DSRC-enabled devices 110 within a second or seconds.

Referring now to the DSRC-enabled vehicle 123. The ADAS system set 180 may include one or more advanced driver assistance systems ("ADAS systems"). See, for example, the one or more ADAS systems 280 depicted in FIG. 2. Examples of ADAS systems included in the ADAS system set 180 include one or more of the following elements of the DSRC-enabled vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems are also referred to herein as an "autonomous feature" or an "autonomous functionality," respectively.

In some embodiments, the autonomous features and autonomous functionality provided by the ADAS systems of the ADAS system set 180 are sufficient to classify the DSRC-enabled vehicle 123 as one or more of the following: a Level 1 autonomous vehicle; a Level 2 autonomous vehicle; a Level 3 autonomous vehicle; a Level 4 autonomous vehicle; and a Level 5 autonomous vehicle. In some embodiments, the DSRC-enabled vehicle 123 is an HAV. An HAV is an autonomous vehicle whose ADAS system set 180 provides autonomous functionality sufficient to operate at Level 3 or greater.

An example of an onboard vehicle computer for the DSRC-enabled vehicle 123 is the computer system 200 depicted in FIG. 2 according to some embodiments. In some embodiments, FIG. 2 depicts an electronic control unit or an onboard unit of the DSRC-enabled vehicle 123.

The PSM data structure 196 is a data structure which stores digital data. For example, the PSM data structure 196 stores one or more instances of PSM data 195 which are received by the communication unit 145 of the DSRC-enabled vehicle 123 via the network 105. For example, the communication unit 145 or DSRC chip 147 of the DSRC-enabled device 110 broadcasts a PSM message that includes the PSM data 195; the communication unit 145 of the DSRC-enabled vehicle 123 receives the PSM message and stores the PSM data 195 included in the PSM message in the PSM data structure 196.

In some embodiments, the communication unit 145 of the DSRC-enabled vehicle 123 receives a plurality of PSM messages broadcasted by a plurality of different DSRC-enabled devices 110 while located at a plurality of different geographic locations and the communication unit 145 of the DSRC-enabled vehicle 123 stores the plurality of different instances of the PSM data 195 included in the plurality of PSM messages in the PSM data structure 196.

In some embodiments, the PSM data structure 196 includes a non-transitory memory of the DSRC-enabled vehicle 123 or is stored in a non-transitory memory as depicted in FIG. 2 (see, e.g., the memory 227).

The PSM data 195 is described below with reference to FIG. 1B according to some embodiments.

In some embodiments, the sensor set 182 may include one or more sensors. The sensor set 182 may record sensor data 183. The sensor data 183 is digital data that describes, for example, physical measurements which are recorded by one or more of the sensors of the sensor set 182. For example, the sensor set 182 may include one or more external sensors that measure the physical environment external to the DSRC-enabled vehicle 123 and the sensor data 183 is digital data that describes the physical measurements recorded by these one or more external sensors.

In some embodiments, the sensor data 183 is an input to one or more of the ADAS systems of the ADAS system set 180 so that these ADAS systems can provide their functionality. In some embodiments, the sensor data 183 provides a secondary source of digital data to verify the accuracy of information included in other sources of digital data such as the PSM data 195. In this way, the sensor data 183 provides a way of verifying the accuracy of some of the information included in the PSM data 195.

In some embodiments, the sensor set 182 may record a physical environment internal to the DSRC-enabled vehicle 123. For example, the sensor set 182 may include one or more internal sensors that monitor and measure the actions of the driver of the DSRC-enabled vehicle 123 or the internal mechanical operations of the DSRC-enabled vehicle 123.

In some embodiments, the sensor set 182 may include one or more sensors that are operable to measure the physical environment outside of the DSRC-enabled vehicle 123. For example, the sensor set 182 may record one or more physical characteristics of the physical environment that is outside of and proximate to the DSRC-enabled vehicle 123.

In some embodiments, the sensor set 182 may include one or more sensors that are operable to measure the physical environment inside a cabin of the DSRC-enabled vehicle 123. For example, the sensor set 182 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 182 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 182 may be operable to record sensor data 183 that describes images or other measurements of the roadway environment and objects or other vehicles present in the roadway environment such as pedestrians, animals, traffic signs, traffic lights, pot holes, etc.

The electronic personal assistant 190 includes code and routines that are operable, when executed by the processor 125 of the DSRC-enabled vehicle 123, to cause the processor 125 of the DSRC-enabled vehicle 123 to receive, identify and respond to queries provided by a driver or passenger of the DSRC-enabled vehicle 123. For example, a driver of the DSRC-enabled vehicle 123 asks for directions to a destination, the electronic personal assistant 190 mines data available via the network 105 or stored locally on a non-transitory memory of the DSRC-enabled vehicle (e.g., the memory 227 described below with reference to FIG. 2) to identify an answer for the query and the electronic personal assistant 190 uses speakers or an electronic display of the DSRC-enabled vehicle 123 to provide the driver with a response to the query that includes the answer.

In some embodiments, the pedestrian density data 192 and the electronic roadway map 194 associated with the pedestrian density data 192 (along with the directory data included in the electronic roadway map 194) are a source of data available to the electronic personal assistant 190 when mining data for answers to queries.

In some embodiments, the directory data for a particular business describes directory information about the business such as, for example: the name of the business; the hours of operation for the business; whether the business is presently closed or open; what the business sells; a menu of goods or services sold by the business; reviews for the business; the names of similar or competing businesses; a physical address for the business; a phone number for the business; a universal resource locator for a website of the business; other nearby businesses; an image of the storefront of the business; navigation instructions to the business; etc.

In some embodiments, the pedestrian density system 199 includes code and routines that are operable, when executed by a processor 125 of the DSRC-enabled vehicle 123, to cause the processor 125 to execute one or more steps of the methods 300, 400 described below with reference to FIGS. 3A, 3B, 4A, 4B and 5B. The pedestrian density system 199 is described in more detail below according to some embodiments.

In some embodiments, the pedestrian density system 199, when executed by the processor 125 of the DSRC-enabled vehicle 123, causes the communication unit 145 of the DSRC-enabled vehicle 123 to transmit the PSM data 195 included PSM data structure 196 (or the PSM data structure 196 itself) to the server 107 via the network 105. This processor of transmitting batches of PSM data 195 or entire PSM data structures 196 may be repeated by a plurality of different DSRC-enabled vehicles 123. In this way, the pedestrian density system 199 of the server 107 builds or modifies the aggregated PSM data structure 197 using PSM data 195 aggregated from a plurality of different DSRC-enabled vehicles 123.

In some embodiments, the pedestrian density system 199 may be implemented using hardware including a field-programmable gate array ("FPGA") or an application-specific integrated circuit ("ASIC"). In some other embodiments, the pedestrian density system 199 may be implemented using a combination of hardware and software. The pedestrian density system 199 may be stored in a combination of the devices (e.g., servers or other devices), or in one of the devices. Additional elements of the DSRC-enabled vehicle 123 are depicted in FIG. 2 according to some embodiments.

Referring now to the server 107. The communication unit 145 of the server 107 receives a wireless message transmitted by the DSRC-enabled vehicle 123 that includes the PSM data 195. The communication unit 145 of the server 107 stores the PSM data 195 in the aggregated PSM data structure 197. The aggregated PSM data structure 197 may include one or more different instances of PSM data 195 transmitted by one or more different DSRC-enabled vehicles 123.

The aggregated PSM data structure 197 is a data structure which stores digital data. For example, the aggregated PSM data structure 197 stores one or more instances of PSM data 195 which are received by the communication unit 145 of the server 107 via the network 105. For example, the communication unit 145 of the DSRC-enabled vehicle 123 transmits a wireless message that includes the PSM data 195 (or the PSM data structure 196) and the communication unit 145 of the server 107 receives the wireless message and stores the PSM data 195 (or PSM data structure) included in the wireless message in the aggregated PSM data structure 197. In some embodiments, this process is repeated for a plurality of different wireless messages transmitted by a plurality of different DSRC-enabled vehicles 123, and the communication unit 145 of the server 107 stores the plurality of different instances of the PSM data 195 included in the plurality of wireless messages in the aggregated PSM data structure 197.

In some embodiments, the aggregated PSM data structure 197 includes a non-transitory memory of the server 107 or is stored in a non-transitory memory such as the memory 227 described below with reference to FIG. 2. In some embodiments, the computer system 200 depicted in FIG. 2 is an example of the server 107 and the aggregated PSM data structure 197 (as well as the other digital data included in the server 107) are stored on the memory 227.

The electronic roadway map 194 is digital data that describes different geographic locations within a geographic area. The electronic roadway map 194 is stored in a non-transitory memory of the server 107. In some embodiments, the electronic roadway map 194 is operable so that each geographic location included in the electronic roadway map 194 can be associated with different instances of pedestrian density data 192 for different days of the week and different times of the day by the pedestrian density system 199. In some embodiments, the electronic roadway map 194 is operable so that the pedestrian density data 192 for different geographic locations is stored in the electronic roadway map 194 by the pedestrian density system 199. See, e.g., FIG. 1D, which depicts an example embodiment of the electronic roadway map 194.

Referring back to FIG. 1A. In some embodiments, the pedestrian density system 199 of the server 107 includes code and routines that are operable, when executed by the processor 125 of the server 107, to cause the processor 125 to execute one or more steps of the methods 300, 400 described below with reference to FIGS. 3A, 3B, 4A, 4B and 5B.

In some embodiments, the pedestrian density system 199, when executed by the processor of the server 107, causes the communication unit 145 of the server 107 to receive a wireless message including the PSM data 195 (or the PSM data structure 196 itself) via the network 105 and then build or modify the aggregated PSM data structure 197 using this PSM data 195. In this way, the pedestrian density system 199 builds or modifies the aggregated PSM data structure 197 using PSM data 195 received from one or more DSRC-enabled vehicles 123.

In some embodiments, the pedestrian density system 199 included on the server 107 is operable to perform different or additional tasks relative to the version of the pedestrian density system 199 included in the DSRC-enabled vehicle 123. In other embodiments, the pedestrian density system 199 included in the server 107 is the same as that included in the DSRC-enabled vehicle 123, but the tasks performed by the different pedestrian density systems 199 varies based on whether it is installed in the DSRC-enabled vehicle 123 or the server 107. In this way, the tasks of the pedestrian density system 199 are distributed across multiple endpoints of an operating environment (e.g., the operating environment 100 of FIG. 1A) in some embodiments.

In some embodiments, the pedestrian density system 199 of the DSRC-enabled vehicle 123 provides all the functionality described below for the pedestrian density system 199 of the server 107 such that the server 107, as well as the step of the communication unit 145 of the DSRC-enabled vehicle 123 transmitting the wireless message to the server 107 including the PSM data 195, is not included these embodiments. For example, FIGS. 3A and 3B describe a method 300 which does not include the pedestrian density system 199 of the server 107 in some embodiments.

In some embodiments, the pedestrian density system 199 aggregates PSM data 195 received from many different DSRC-enabled vehicles 123 to form an aggregated PSM data structure 197. The aggregated PSM data structure 197 includes a plurality of instances of PSM data 195 for many different geographic locations at many different times of day and days of the week. An instance of PSM data 195 includes device graphical positioning system data 188 ("device GPS data" 188) that describes the geographical position for the DSRC-enabled devices 110 which initially broadcast or unicast the PSM message that included the instance of PSM data 195. The device GPS data 188 for a particular instance of PSM data 195 describes the geographical position of the DSRC-enabled device 110 (as well as the pedestrian 103 caring the DSRC-enabled device 110) at the time when the PSM message is transmitted. In some embodiments, the device GPS data 188 is DSRC-compliant GPS data that describes the geographical position of the DSRC-enabled device 110 (as well as the pedestrian 103) with an accuracy of plus or minus 1.5 meters relative to the actual location of the DSRC-enabled device 110.

In some embodiments, the pedestrian density system 199 includes an electronic roadway map 194 that includes a plurality of instances of business graphical positioning system data 187 ("business GPS data" 187) for a plurality of businesses. The business GPS data 187 for a particular business describes a geographical area occupied by that particular business, and this geographical area can include a plurality geographical points which correspond to a plurality of instances of device GPS data 188 at any given time since the geographical area occupied by a business is greater than the geographical area occupied by a combination of latitude and longitude which is described by the device GPS data 188. See, e.g., FIG. 1C, which depicts an example of the relative sizes of the geographical area described by an instance of business GPS data 187 and the geographical point (as a combination latitude and longitude) described by an instance of device GPS data 188.

Figure 1C:
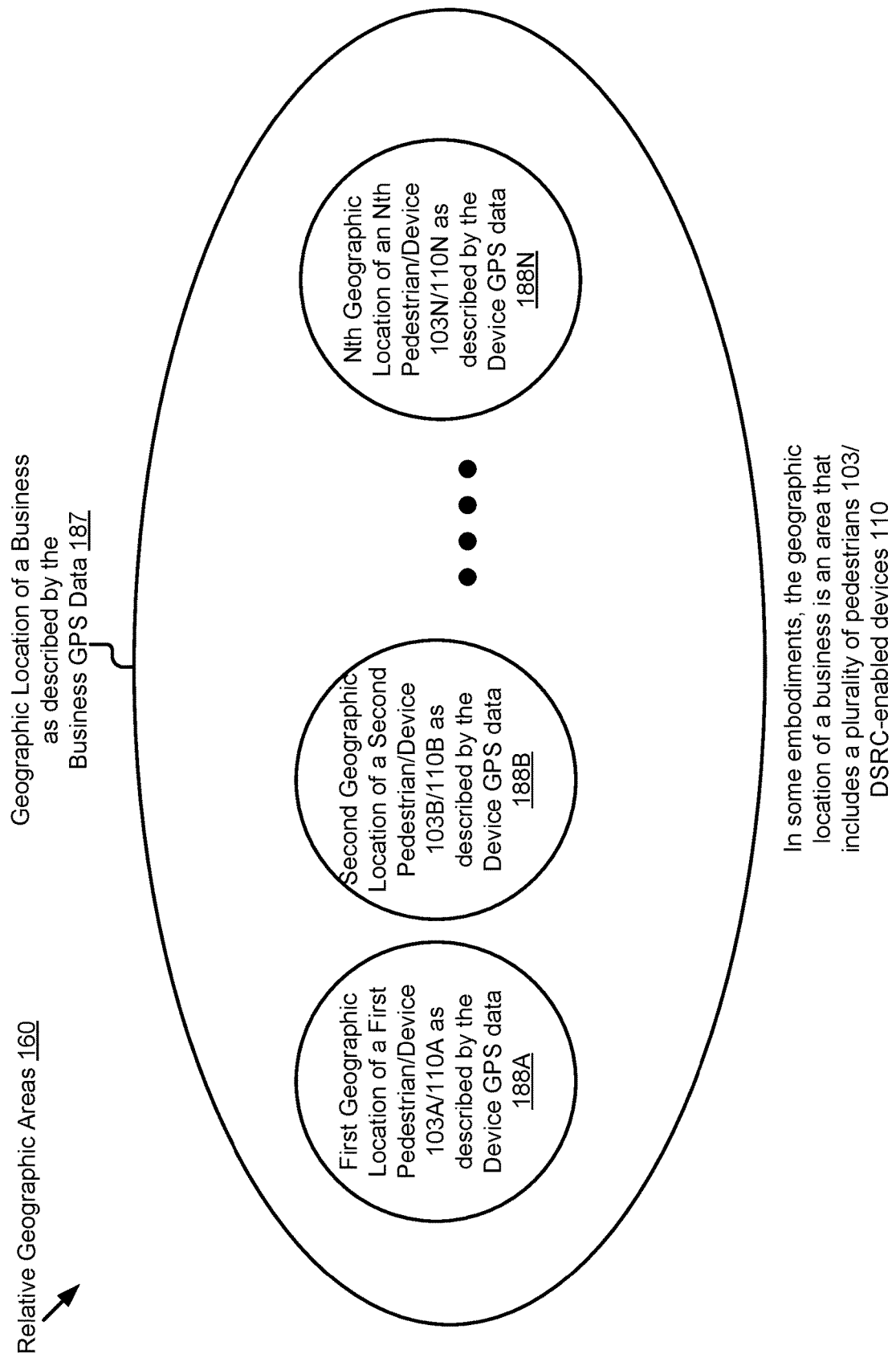
FIG. 1C is a block diagram illustrating relative geographic areas described by the business GPS data and the device GPS data according to some embodiments.

In some embodiments, the pedestrian density system 199 analyzes (1) the device GPS data 188 included in the PSM data 195 of the aggregated PSM data structure 197 and (2) the business GPS data 187 of the electronic roadway map 194 to identify matches between the device GPS data 188 and the business GPS data 187. For example, a match occurs if a particular instance of device GPS data 188 indicates a geographic location that corresponds to a location within the geographic area occupied by a particular business as described by the business GPS data 187. An example of this concept is depicted in FIG. 1C. This match indicates that a pedestrian 103 is present at the business (whose geographical area is described by the business GPS data 187) on a particular day and time (which is described by the PSM data 195 which included the device GPS data 188 that matched the business GPS data 187). For some instances of PSM data 195, a match is not found by this analysis if the device GPS data 188 does not correspond to a latitude and longitude that is included in the geographic area occupied by a particular business as described by the business GPS data 187. This analysis is repeated by the pedestrian density system 199 for the unanalyzed instances of PSM data 195 included in the aggregated PSM data structure 197 to generate a plurality of instances of pedestrian density data 192. An instance of pedestrian density data 192 describes a total number of pedestrians present at a particular business on different times of day and days of the week as identified by the analysis described in this paragraph. The pedestrian density data 192 describes other information about the pedestrians present at a business. See, e.g., FIG. 5A and FIG. 5B.

In some instances, for some embodiments, because the PSM messages are broadcast in a repeated fashion in some embodiments, the aggregated PSM data structure 197 (or the PSM data structure 196 if this analysis occurs at the DSRC-enabled vehicle 123) will include duplicate entries of PSM data 195 for a particular pedestrian at a particular business on a particular day and time. However, the instances of PSM data 195 includes various types of metadata (e.g., path history data, path prediction data, group size data, group radius data, etc.) that can be analyzed by the pedestrian density system 199 to identify duplicate entries which are then deleted from the aggregated PSM data structure 197 (or the PSM data structure 196) or otherwise discounted from the total number of pedestrians described by the plurality of instances of pedestrian density data 192 for a particular business. For example, the pedestrian density system 199 analyses the PSM data 195 to identify a commonality across a plurality of the different metadata for two or more instances of PSM data 195, and this commonality is indicative of a duplicate entry which needs to be either deleted or discounted from the total pedestrian count described by the pedestrian density data 192. In this way, the pedestrian density data 192 is made more accurate by identifying and eliminating duplicate entries for particular pedestrians at particular businesses.

In some embodiments, other approaches are used to eliminate duplicate entries of PSM data 195 for a particular pedestrian at a particular business on a particular day and time. For example, unique identifiers are assigned by the pedestrian density system 199 to the different instances of PSM data 195 based on the different DSRC-enabled devices 110 which originated these instances of PSM data 195, and these unique identifiers are used to identify and eliminate duplicate entries of PSM data 195 for a particular pedestrian at a particular business on a particular day and time.

In another example of eliminating duplicate entries of PSM data 195, unique identifiers are assigned to each DSRC-enabled device 110 which originates instances of PSM data 195, and these unique identifiers are then associated with each instance of PSM data 195 originated by these DSRC-enabled devices 110, and then subsequently used to identify and eliminate duplicate entries of PSM data 195 for a particular pedestrian at a particular business on a particular day and time.

In some embodiments, each DSRC-enabled device 110 includes identifying data in each PSM message which is used by the pedestrian density system 199 to identify and eliminate duplicate entries of PSM data 195 for a particular pedestrian at a particular business on a particular day and time. In some embodiments, each DSRC-enabled device 110 rotates its identifying data on a rolling basis, such that the identifying data for a particular DSRC-enabled device 110 changes at a regular interval among some set number of instances of identifying data. In this situation, the pedestrian density system 199 is still able to identify the identity of different DSRC-enabled devices 110 and differentiate among the PSM data 195 they provide based on the commonality of metadata included in the PSM data 195 across a plurality of instances of PSM data 195.

In some embodiments, the steps taken to identify and eliminate duplicate entries of PSM data 195 for a particular pedestrian at a particular business on a particular day and time include the application of anonymization techniques such that the identify of particular pedestrians (or their particular DSRC-enabled device 110) is not capable of ascertaining based on the digital data that is stored by the pedestrian density system 199. For example, the pedestrian density data 192 describes a total number of pedestrians present at a particular business, but not the identity of the pedestrians or the identity of their DSRC-enabled device 110

(e.g., MAC address) or any other combination of data that can be used to ascertain these identities.

In some embodiments, an instance of pedestrian density data 192 describes one or more of the following: (1) the business GPS data 187 for the business which matched the device GPS data 188 for the PSM data 195 used to generate this instance of pedestrian density data 192; (2) time data describing different days of the week and the times of day described by this instance of pedestrian density data 192 based on the times of day and days of the week described by the PSM data 195 used to generate this instance of pedestrian density data 192; (3) count data describing a number of pedestrians present at the business for different days of the week and times of the day; (4) gender variations present among pedestrians at the business at different days of the week and times of the day [e.g., of the "N" number of pedestrians present at this "B" business at "T" time of day and "D" day of the week, "X" are women and "Y" are men, where N, B, T, D, X and Y are variables in the pedestrian density data]; (5) age variations pedestrians present at the business at this day of the week and time of the day; (6) parental status of the pedestrians present at the business at this day of the week and time of the day [e.g., an estimate of whether they are a parent of a young child as estimated by whether they are pushing a stroller]; and (7) any other metrics which are determinable based on the PSM data 195. See, e.g., FIGS. 1B, 5A and 5B.

In some embodiments, the pedestrian density system 199 stores the pedestrian density data 192 in a density data structure 191. The density data structure 191 includes a data structure (e.g., a database, table or some other data structure) that stores the pedestrian density data 192. In some embodiments, the density data structure 191 also stores one or more of the electronic roadway map 194 and the business GPS data 187.

In some embodiments, the density data structure 191 is an index of the electronic roadway map 194 which organizes a plurality of instances of business GPS data 187 and a plurality of instances of pedestrian density data 192. In some embodiments, the density data structure 191 is organized so that an instance of digital data that describes a geographical location is received by the density data structure 191 as an input and an instance of pedestrian density data 192 corresponding to the geographical location (as well as other data such as directory data for a business located at the geographical location) is outputted by the density data structure 191 responsive to receiving the input. In this way, the density data structure 191 is operable to work with the electronic personal assistant 190 to assist it in accessing the pedestrian density data 192 as well as other data stored in the density data structure 191.

In some embodiments, the processes described above are repeated as new PSM messages are received so that the pedestrian density data 192 is updated and kept fresh.

In some embodiments, the pedestrian density system 199 associates the plurality of instances of pedestrian density data 192 with the business GPS data 187 included in the electronic roadway map 194 for these different businesses. See, e.g., FIG. 1D. In this way, the pedestrian density data 192 for a particular business is retrievable at a runtime using the electronic roadway map 194.

In some embodiments, the electronic roadway map 194 includes directory data about the businesses such as their hours of operation, their business type (e.g., restaurant, bar, gas station, etc.), variations in the services they sell (e.g., cuisine type, a general category of the products sold, a general category of the services sold, etc.), etc. such that the electronic roadway map 194 and the pedestrian density data 192 can be used, alone or in combination, by an electronic personal assistant 190 of the DSRC-enabled vehicle 123 to respond to queries. For example, a driver of the DSRC-enabled vehicle 123 may ask their electronic personal assistant 190 a question such as "What restaurants are open now that serve Mexican cuisine and are not too busy?" In this example, the electronic roadway map 194 may include directory data and pedestrian density data 192 that assists the electronic personal assistant 190 to respond to this query. For example, the directory data describes what services the business sells (i.e., a restaurant), what type of cuisine it provides (i.e., Mexican), its hours of operation. Also in this example, the pedestrian density data 192 beneficially provided by the pedestrian density system 199 describes a number of customers present at the business as indicated on real-time or historical PSM data 195.

In some embodiments, the pedestrian density data 192 is retrieved at a runtime by the pedestrian density system 199 and provided to the ADAS system set 180 of a DSRC-enabled vehicle 123 as the geographic location of the DSRC-enabled vehicle 123 changes so that the ADAS system set 180 of the DSRC-enabled vehicle 123 modifies the motion profile of the DSRC-enabled vehicle 123 to correspond to the number of pedestrians present at the businesses proximate to the current geographic location of the DSRC-enabled vehicle 123. For example, if more pedestrians are present, then the motion profile of the DSRC-enabled vehicle 123 is made more cautions by the ADAS system set 180.

In some embodiments, the pedestrian density system 199 of the server 107 may be implemented using hardware including an FPGA or an ASIC. In some other embodiments, the pedestrian density system 199 may be implemented using a combination of hardware and software. The pedestrian density system 199 may be stored in a combination of the devices (e.g., servers or other devices), or in one of the devices.

Referring now to the DSRC-enabled device 110. The elements of the DSRC-enabled device 110 are described above, and so, those descriptions will not be repeated here. In addition to the elements described above, the DSRC-enabled device 110 includes a non-transitory memory (such as the memory 227 described below with reference to FIG. 2) in some embodiments.

In some embodiments, the DSRC-enabled device 110 generates PSM data 195 including device GPS data 188 and transmits PSM messages including the PSM data 195. The PSM data 195 is described in more detail below with reference to FIG. 1B. The PSM messages are broadcasted or unicasted by the DSRC chip 147 of the DSRC-enabled device 110. The DSRC chip 147 of the DSRC-enabled vehicle 123 receives the PSM message and the pedestrian density system 199 uses the PSM data included in the PSM message to provide its functionality.

In some embodiments, the DSRC-enabled device 110 includes a non-transitory memory storing data which describe a plurality of different geographic locations for a plurality of different businesses or locations, and the DSRC-enabled device 110 only transmits a PSM message when the DSRC-enabled device 110 is within one of these businesses or locations based on the GPS data provided by the DSRC-compliant GPS unit 170 included in the DSRC-enabled device 110.

The RSU 198 is a DSRC roadside unit which is operable to send and receive DSRC messages such as PSM messages. The RSU 198 includes network communication capabilities and is operable to wirelessly communicate with the server 107, the DSRC-enabled device 110 and the DSRC-enabled vehicle 123 via the network 105. In some embodiments, the computer system 200 depicted in FIG. 2 is an example of the RSU 198.

Referring now to FIG. 1B, depicted is a block diagram illustrating an example of PSM data 195 according to some embodiments. In some embodiments, an instance of PSM data 195 describes the relationship between a particular pedestrian (or a group of pedestrians) in relation to roadway infrastructure for a particular geographic location. The roadway infrastructure may be an element of a roadway environment which includes a DSRC-enabled vehicle 123 which receives the PSM message that includes the PSM data 195.

As depicted, the PSM data 195 includes two parts: Part 1; and Part 2.

Part 1 of the PSM data 195 includes digital data that describes: the GPS data for the DSRC-enabled device; and the path history data for the DSRC-enabled device.

The elements of the GPS data are depicted in FIG. 1B according to some embodiments. In some embodiments, the GPS data is generated by a DSRC-compliant GPS unit such that the GPS data included in Part 1 is accurate to within plus or minus 1.5 meters 68% of the time when the DSRC-compliant GPS unit of the DSRC-enabled device is under an open sky.

In some embodiments, the path history data describes historical GPS data for a successive number of past times such that the path history data describes a historical path of the DSRC-enabled device.

Part 2 of the PSM data 195 includes digital data that describes: a path prediction of the DSRC-enabled device over a specified time and frame (e.g., based on a trajectory indicated by the path history data of Part 1); a group size for the pedestrian who is carrying the DSRC-enabled device; a group radius for the pedestrian who is carrying the DSRC-enabled device; an estimate of whether the pedestrian is pushing a stroller (e.g., based on one or more of their path history, trajectory, acceleration, walking pattern and other data indicated by the digital data included in Part 1 or Part 2 versus known data for people pushing strollers); an estimate of whether the pedestrian has the intent to cross a roadway (e.g., based on the pedestrian's trajectory); an estimate of whether the pedestrian is traveling with an animal (e.g., based on one or more of their path history, trajectory, acceleration, walking pattern and other data indicated by the digital data included in Part 1 or Part 2 versus known data for pedestrians traveling with animals); an estimate of the type of animal traveling with the pedestrian if the pedestrian is estimated to be walking with an animal (e.g., based on one or more of their path history, trajectory, acceleration, walking pattern and other data indicated by the digital data included in Part 1 or Part 2 versus known data for specific animal types or pedestrians traveling with such animals); an estimate of whether the pedestrian is utilizing non-vehicular propulsion (e.g., based on one or more of their path history, trajectory, acceleration, walking pattern and other data indicated by the digital data included in Part 1 or Part 2 versus known data for pedestrians traveling on a bike, scooter, skateboard, or any other type of non-vehicle propulsion.)

Referring now to FIG. 1C, depicted is a block diagram illustrating relative geographic areas 160 described by an instance of business GPS data 187 and a plurality of instances of device GPS data 188A, 188B, 188N according to some embodiments.

In the depicted embodiment, a geographic area including a business as described by an instance of business GPS data 187 is larger than a geographic point (or location) which is occupied by a DSRC-enabled device 110 (or pedestrian 103) as described by an instance of device GPS data 188. As such, the geographic area of a business may include a plurality of pedestrians at a given time. Accordingly, in some embodiments analysis of the PSM data 195 stored in the aggregated PSM data structure 197 (or the PSM data structure 196) indicates that the geographic area including the business includes a plurality of pedestrians 103 present in the geographic area of the business at any given time.

In the depicted embodiment, a geographic location of a business as described by an instance of business GPS data 187 includes: a first geographic location of a first pedestrian 103A or DSRC-enabled device 110A as described by a first instance of device GPS data 188A; a second geographic location of a second pedestrian 103B or DSRC-enabled device 110B as described by a second instance of device GPS data 188B; and an Nth geographic location of an Nth pedestrian 103N or DSRC-enabled device 110N as described by an Nth instance of device GPS data 188N, where "N" is equal to any positive whole number greater than two.

Figure 1D:
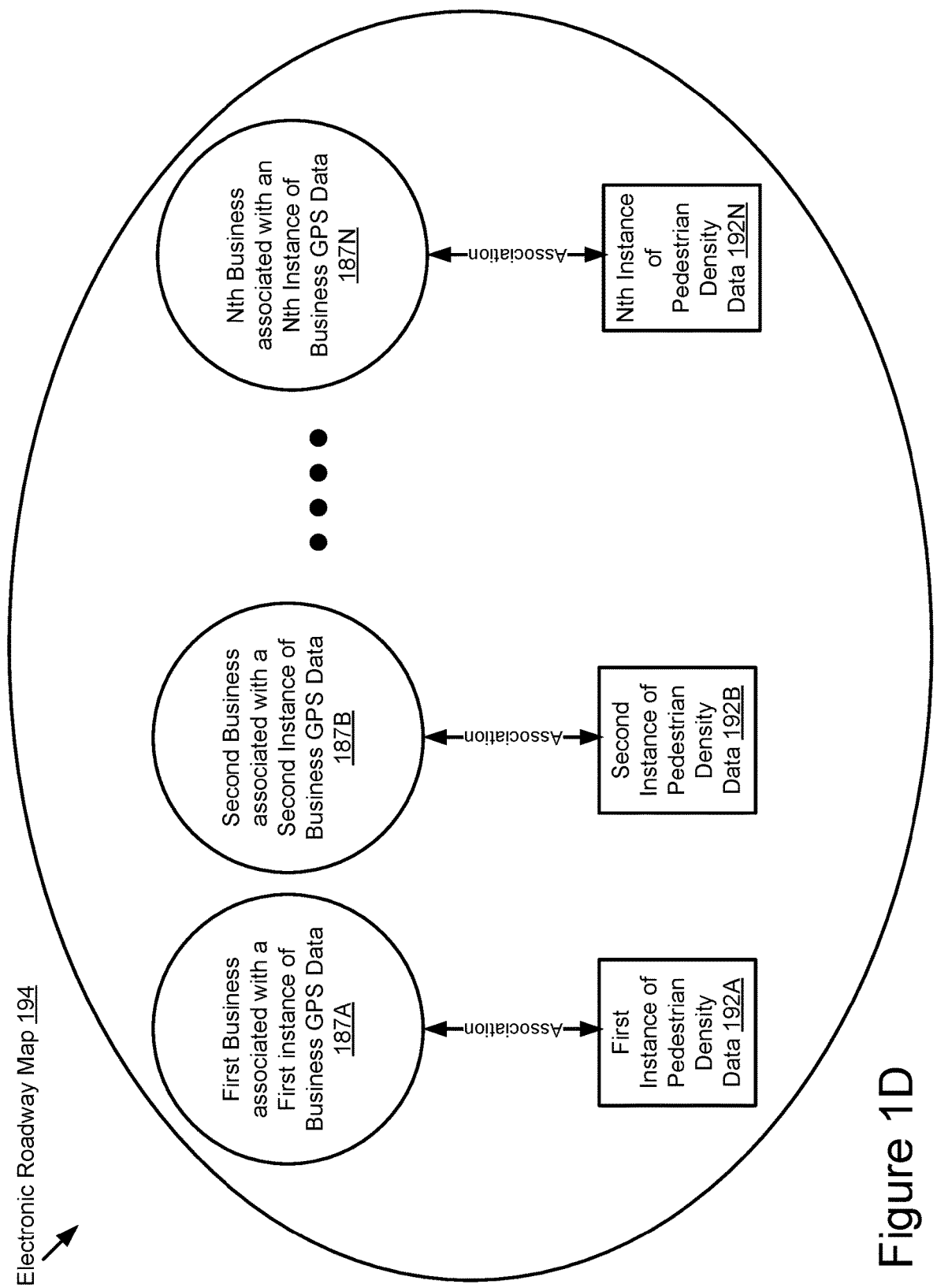
FIG. 1D is a block diagram illustrating an example electronic roadway map according to some embodiments.

Referring now to FIG. 1D, depicted is a block diagram illustrating an example of an electronic roadway map 194 according to some embodiments.

In the depicted embodiment, an electronic roadway map 194 includes: a first business associated with a first instance of business GPS data 187A; a second business associated with a second instance of business GPS data 187B; and an Nth business associated with an Nth instance of business GPS data 187N, where "N" is equal to any positive whole number greater than two. The first instance of business GPS data 187A is associated with a first instance of pedestrian density data 192A which describes information about pedestrians at the first business. The second instance of business GPS data 187B is associated with a second instance of pedestrian density data 192B which describes information about pedestrians at the second business. The Nth instance of business GPS data 187N is associated with an Nth instance of pedestrian density data 192N which describes information about pedestrians at the Nth business. An example of the information described by the pedestrian density data 192A, 192B, 192N is depicted and described below with reference to FIGS. 5A and 5B.

Example Computer Systems

Referring now to FIG. 2, depicted is a block diagram illustrating an example computer system 200 including the pedestrian density system 199 according to some embodiments.

In some embodiments, the computer system 200 may include a special-purpose computer system that is programmed to perform one or more steps of a method 300, 400 described below with reference to FIGS. 3A, 3B, 4A, 4B and 5B.

In some embodiments, the computer system 200 may be an onboard vehicle computer of the DSRC-enabled vehicle 123. In some embodiments, the computer system 200 may include an electronic control unit, onboard unit head unit or some other processor-based computing device of the DSRC-enabled vehicle 123. In some embodiments, the computer system 200 is an example of the server 107. In some embodiments, the computer system 200 is an example of the RSU 198.

The computer system 200 may include one or more of the following elements according to some examples: the pedestrian density system 199; the processor 125; the memory 227; the communication unit 145; the DSRC-compliant GPS unit 170; an ADAS system set 180 include one or more ADAS systems 280; an electronic personal assistant 190; and a sensor set 182. These components of the computer system 200 are communicatively coupled by the bus 220.

The following components are depicted with dashed lines in FIG. 2 to indicate that they are optional elements of the computer system 200: the ADAS system set 180; the DSRC-compliant GPS unit 170; the electronic personal assistant 190; and the sensor set 182. For example, in some embodiments the computer system 200 is a server 107, and as such, would not include the ADAS system set 180, the sensor set 182 or the electronic personal assistant 190.

In the illustrated embodiment, the processor 125 is communicatively coupled to the bus 220 via a signal line 228. The ADAS system set 180 is communicatively coupled to the bus 220 via a signal line 230. The communication unit 145 is communicatively coupled to the bus 220 via a signal line 232. The memory 227 is communicatively coupled to the bus 220 via a signal line 234. The DSRC-compliant GPS unit 170 is communicatively coupled to the bus 220 via a signal line 236. The electronic personal assistant 190 is communicatively coupled to the bus 220 via a signal line 238. The sensor set 182 is communicatively coupled to the bus 220 via a signal line 240.

These elements of the computer system 200 where described above with reference to FIG. 1A-1D, and their descriptions will not be repeated here: the pedestrian density system 199; the processor 125; the ADAS system set 180; the communication unit 145; and the DSRC-compliant GPS unit 170; the electronic personal assistant 190; and the sensor set 182.

The one or more ADAS systems 280 include the one or more ADAS systems of the ADAS system set 180.

The memory 227 is a non-transitory storage medium that stores instructions or data that may accessed and executed by the processor 125. The instructions or data may include code for performing the techniques described herein. The memory 227 may be a dynamic random access memory (DRAM) device, a static random access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 227 may be reserved for use as a buffer or virtual random access memory (virtual RAM). The computer system 200 may include one or more memories 227.

The memory 227 may store one or more of the following elements: the pedestrian density system 199; the aggregated PSM data structure 197; a plurality of instances of PSM data 195; the density data structure 191; a plurality of instances of pedestrian density data 192; a plurality of instances of business GPS data 187; the electronic roadway map 194; the sensor data 183; the PSM data structure 196; a plurality of instances of device GPS data 188; and vehicle GPS data 186.

In some embodiments, the memory 227 stores any of the data, information or wireless messages described above with reference to FIGS. 1A, 1B, 1C and 1D or below with reference to FIGS. 3A, 3B, 4A, 4B, 5A and 5B In some embodiments, the memory 227 stores any data necessary for the computer system 200 to provide its functionality.

In the illustrated embodiment shown in FIG. 2, the pedestrian density system 199 includes a communication module 202, an aggregator module 204 and a determination module 206.

The communication module 202 can be software including routines for handling communications between the pedestrian density system 199 and other components of the computer system 200. In some embodiments, the communication module 202 can be a set of instructions executable by the processor 125 to provide the functionality described below for handling communications between the pedestrian density system 199 and other components of the computer system 200. In some embodiments, the communication module 202 can be stored in the memory 227 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100 (see, e.g., FIG. 1A). For example, the communication module 202 receives or transmits, via the communication unit 145, any of the data stored in the memory 227 or messages described herein. The communication module 202 may send or receive any of the data or messages described herein via the communication unit 145.

In some embodiments, the communication module 202 receives data from components of the computer system 200 and stores the data in the memory 227 (or a buffer or cache of the computer system 200). For example, the communication module 202 receives any of the data described above with reference to the memory 227 from the communication unit 145 (via the network 105) and stores this data in the memory 227 (or a buffer or cache of the computer system 200).

In some embodiments, the communication module 202 may handle communications between components of the pedestrian density system 199.

The aggregator module 204 can be software including receiving PSM messages from the communication module 202 (which is received by the communication module 202 from the communication unit 145), extracting the PSM data 195 from the PSM messages and forming one or more of the PSM data structure 196 or the aggregated PSM data structure 197. In some embodiments, the aggregator module 204 can be a set of instructions executable by the processor 125 to cause the communication unit 145 to transmit wireless messages including the PSM data 195 or the PSM data structure 196 to the server 107 via the network 105.

In some embodiments, the PSM data 195 does not describe the current time of day or the current day of the week, and the aggregator module 204 can be a set of instructions executable by the processor 125 to cause the DSRC-compliant GPS unit 170 to retrieve digital data describing a current time of day or a current day of the week and then supplementing the PSM data 195 so that it includes this information.

In some embodiments, the aggregator module 204 can be stored in the memory 227 of the computer system 200 and can be accessible and executable by the processor 125. The aggregator module 204 may be adapted for cooperation and communication with the processor 125 and other components of the computer system 200 via signal line 224.

The determination module 206 can be software including routines for analyzing one or more of the following types of data and generating the pedestrian density data 192: the PSM data 195 included in one or more of the PSM data structure 196 or the aggregated PSM data structure 197; and the plurality of instances of business GPS data 187 included in the electronic roadway map 194.

In some embodiments, the determination module 206 organizes the pedestrian density data 192 in the density data structure 191. In some embodiments, the determination module 206 organizes the pedestrian density data 192 in electronic roadway map 194.

In some embodiments, the determination module 206 can be stored in the memory 227 of the computer system 200 and can be accessible and executable by the processor 125. The determination module 206 may be adapted for cooperation and communication with the processor 125 and other components of the computer system 200 via signal line 226.

Example Methods

Figure 3A:
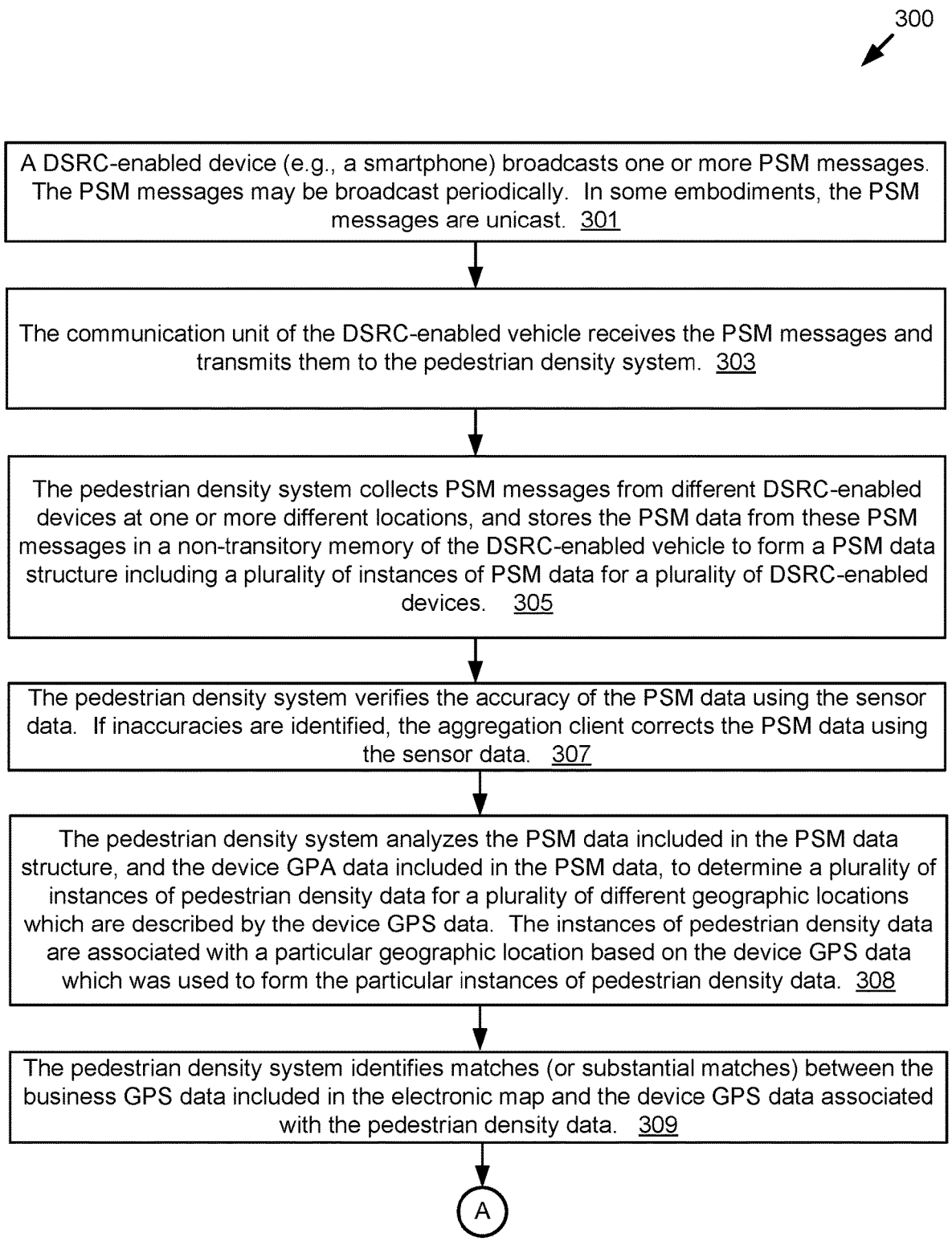
FIGS. 3A and 3B are an example flow diagram of a method for determining pedestrian density data according to some embodiments.
Figure 3B:
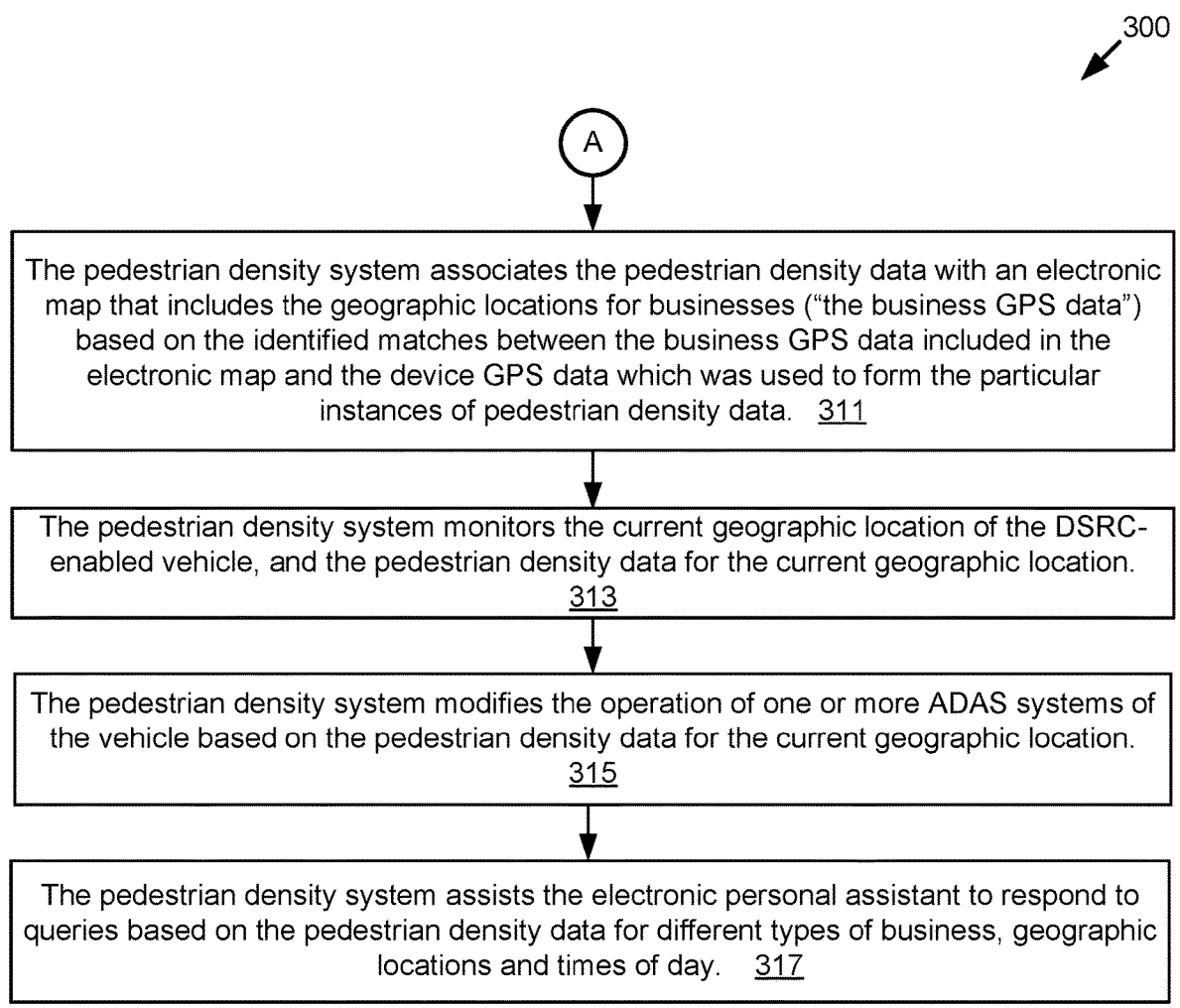

Referring now to FIGS. 3A and 3B, depicted is an example flow diagram of a method 300 for determining pedestrian density data according to some embodiments. One or more of the steps described herein for the method 300 may be executed by the computer system 200.

Referring now to FIG. 3A. At step 301, a DSRC-enabled device (e.g., a smartphone or some other DSRC-enabled device which is not a vehicle) broadcasts one or more PSM messages. The PSM messages may be broadcast periodically. In some embodiments, the PSM messages are unicast.

At step 303, the communication unit of the DSRC-enabled vehicle receives the PSM messages and transmits them to the pedestrian density system.

At step 305, the pedestrian density system collects PSM messages from different DSRC-enabled devices at a plurality of different locations, and stores the PSM data from these PSM messages in a non-transitory memory of the DSRC-enabled vehicle to form a PSM data structure including a plurality of instances of PSM data for a plurality of DSRC-enabled devices.

At step 307, the pedestrian density system verifies the accuracy of the PSM data using the sensor data. If inaccuracies are identified, the aggregation client corrects the PSM data using the sensor data.

At step 308, the pedestrian density system analyzes the PSM data included in the PSM data structure, and the device GPA data included in the PSM data, to determine a plurality of instances of pedestrian density data for a plurality of different geographic locations which are described by the device GPS data. The instances of pedestrian density data are associated with a particular geographic location based on the device GPS data which was used to form the particular instances of pedestrian density data. For example, the pedestrian density system identifies whether a match exists between one or more instances of device GPS data and an instance of business GPS data At step 309, the pedestrian density system identifies matches (or substantial matches) between the business GPS data included in the electronic map and the device GPS data associated with the pedestrian density data.

Referring now to FIG. 3B. At step 311, the pedestrian density system associates the pedestrian density data with an electronic map that includes the geographic locations for businesses ("the business GPS data") based on the identified matches between the business GPS data included in the electronic map and the device GPS data which was used to form the particular instances of pedestrian density data. In some embodiments, steps 308, 309 and 311 are part of the same step for analyzing the PSM data (and its included device GPS data) and the business GPS data to identify matches and form the pedestrian density data.

At step 313, the pedestrian density system monitors the current geographic location of the DSRC-enabled vehicle, and the pedestrian density data for the current geographic location.

Steps 315 and 317 are example steps that are taken at a runtime to assist elements of the DSRC-enabled vehicle such as the set of ADAS systems (e.g., step 315) or the electronic personal assistant (e.g., step 317).

At step 315, the pedestrian density system modifies the operation of one or more ADAS systems of the vehicle based on the pedestrian density data for the current geographic location.

At step 317, the pedestrian density system assists the electronic personal assistant to respond to queries based on the pedestrian density data for different types of business, geographic locations and times of day. For example, the pedestrian density system provides the electronic personal assistant with pedestrian density data for one or more businesses at one or more times of day or days of week based on a query received from the electronic personal assistant.

Figure 4A:
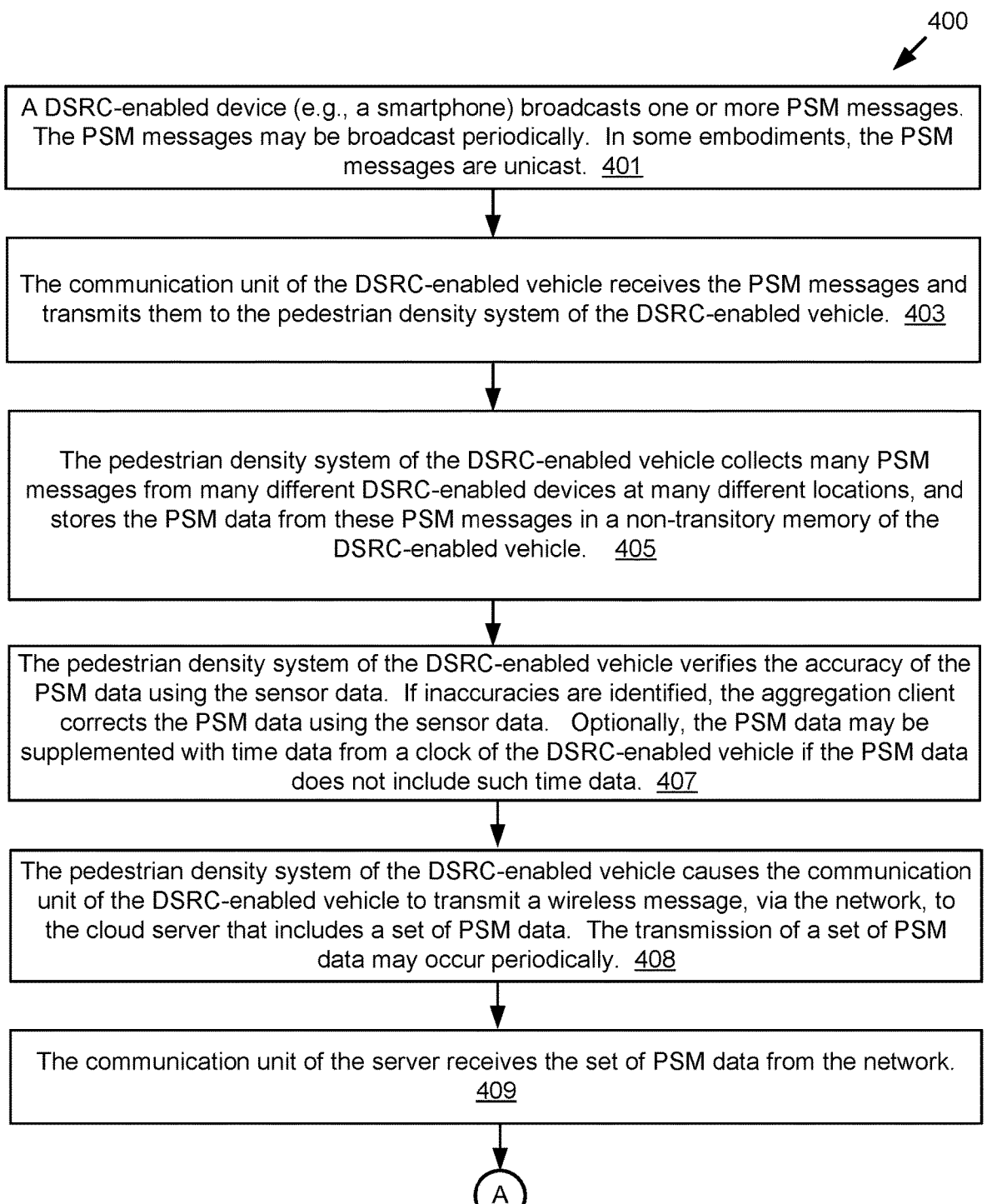
FIGS. 4A and 4B are an example flow diagram of a method for determining pedestrian density data using a DSRC-enabled vehicle and a server according to some embodiments.
Figure 4B:
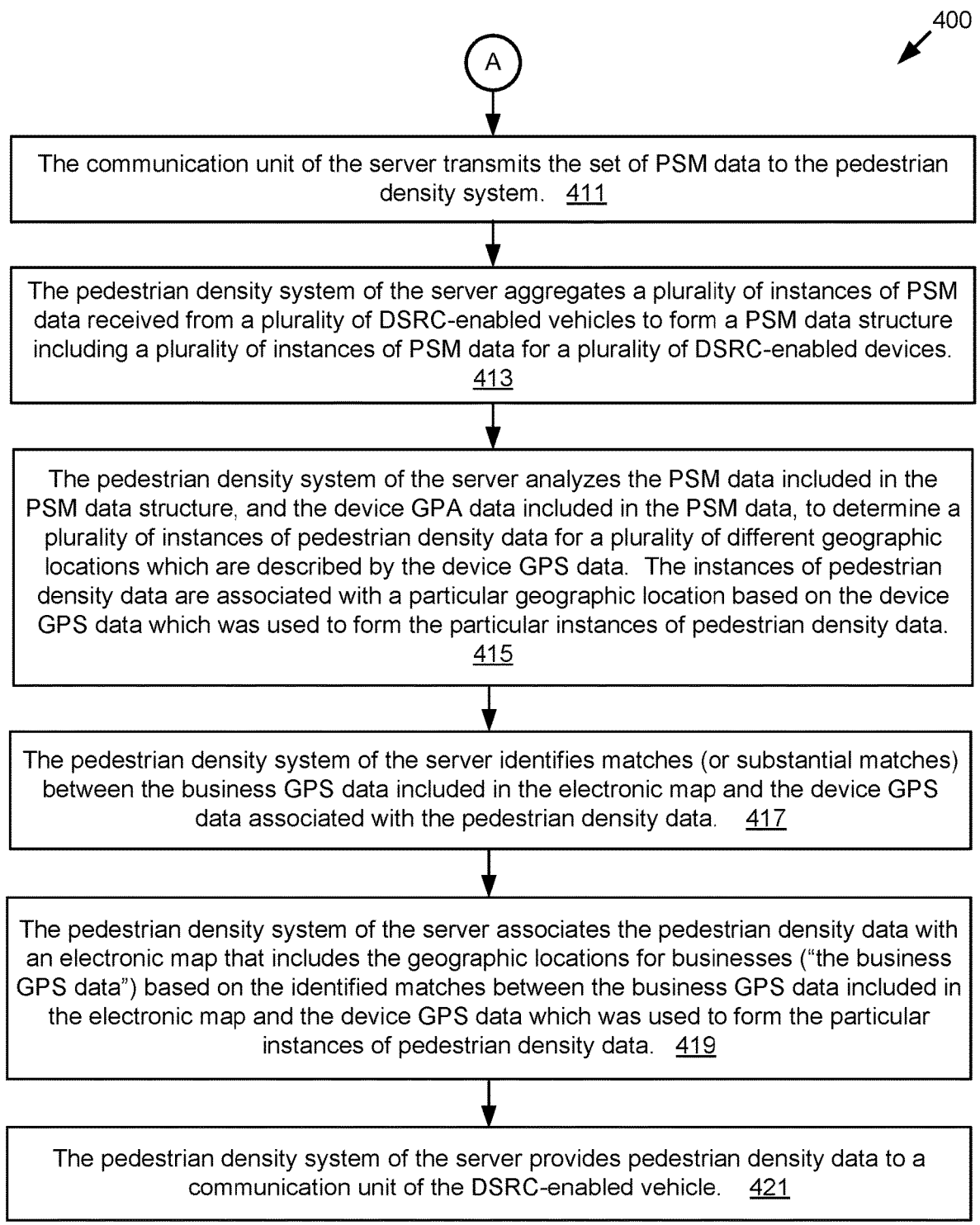

Referring now to FIGS. 4A and 4B, depicted is example flow diagram of a method 400 for determining pedestrian density data using a DSRC-enabled vehicle and a server according to some embodiments.

Referring to FIG. 4A. At step 401, a DSRC-enabled device (e.g., a smartphone) broadcasts one or more PSM messages. The PSM messages may be broadcast periodically. In some embodiments, the PSM messages are unicast.

At step 403, the communication unit of the DSRC-enabled vehicle receives the PSM messages and transmits them to the pedestrian density system of the DSRC-enabled vehicle.

At step 405, the pedestrian density system of the DSRC-enabled vehicle collects many PSM messages from many different DSRC-enabled devices at many different locations, and stores the PSM data from these PSM messages in a non-transitory memory of the DSRC-enabled vehicle.

At step 407, the pedestrian density system of the DSRC-enabled vehicle verifies the accuracy of the PSM data using the sensor data. If inaccuracies are identified, the aggregation client corrects the PSM data using the sensor data. Optionally, the PSM data may be supplemented with time data from a clock of the DSRC-enabled vehicle if the PSM data does not include such time data.

At step 408, the pedestrian density system of the DSRC-enabled vehicle causes the communication unit of the DSRC-enabled vehicle to transmit a wireless message, via the network, to the cloud server that includes a set of PSM data. The transmission of a set of PSM data may occur periodically.

At step 409, the communication unit of the server receives the set of PSM data from the network.

Referring now to FIG. 4B. At step 411, the communication unit of the server transmits the set of PSM data to the pedestrian density system.

At step 413, the pedestrian density system of the server aggregates a plurality of instances of PSM data received from a plurality of DSRC-enabled vehicles to form a PSM data structure including a plurality of instances of PSM data for a plurality of DSRC-enabled devices.

At step 415, the pedestrian density system of the server analyzes the PSM data included in the PSM data structure, and the device GPA data included in the PSM data, to determine a plurality of instances of pedestrian density data for a plurality of different geographic locations which are described by the device GPS data. The instances of pedestrian density data are associated with a particular geographic location based on the device GPS data which was used to form the particular instances of pedestrian density data.

At step 417, the pedestrian density system of the server identifies matches (or substantial matches) between the business GPS data included in the electronic map and the device GPS data associated with the pedestrian density data.

At step 419, the pedestrian density system of the server associates the pedestrian density data with an electronic map that includes the geographic locations for businesses ("the business GPS data") based on the identified matches between the business GPS data included in the electronic map and the device GPS data which was used to form the particular instances of pedestrian density data.

At step 421, the e pedestrian density system of the server provides pedestrian density data to a communication unit of the DSRC-enabled vehicle. One or more processors of the DSRC-enabled vehicle use the pedestrian density data, for example, to modify the operation of one or more ADAS systems of the DSRC-enabled vehicle or provide answers to a query presented to an electronic personal assistant of the DSRC-enabled vehicle.

Figure 5A:
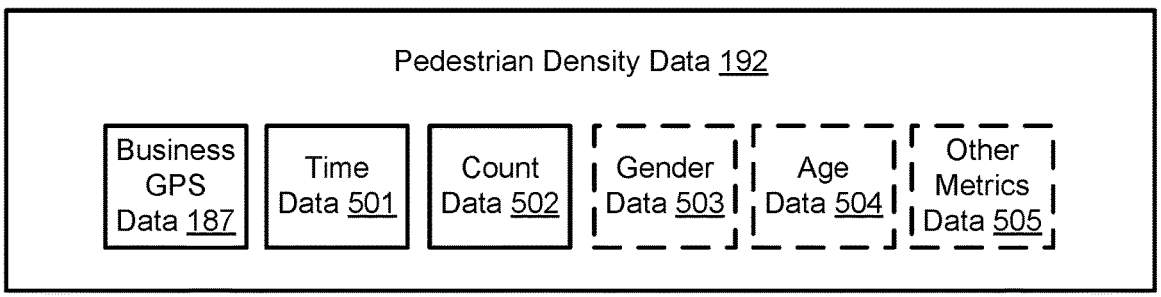
FIG. 5A is a block diagram of an example instance of pedestrian density data according to some embodiments.

Referring now to FIG. 5A, depicted is a block diagram of an example instance of pedestrian density data 192 according to some embodiments.

As depicted, the pedestrian density data 192 includes the following elements of digital data: business GPS data 187; time data 501; count data 502; gender data 503; age data 504; and other metrics data 505.

In some embodiments, the business GPS data 187 is digital data that describes the geographical area for a business which matched one or more instances of device GPS data 188 for one or more instances of PSM data 195 used to generate the instance of pedestrian density data 192 depicted in FIG. 5A.

In some embodiments, the time data 501 is digital data describing different days of the week and the times of day described by this instance of pedestrian density data 192 based on the times of day and days of the week described by the one or more instances of PSM data 195 used to generate the instance of pedestrian density data 192 depicted in FIG. 5A.

In some embodiments, the count data 502 is digital data that describes a number of pedestrians present at the business (whose geographic area is described by the business GPS data 187) for different days of the week and times of the day. In some embodiments, the number of pedestrians is discounted to account for duplicate instances of PSM data 195. In some embodiments, the pedestrian density data 192 is anonymized to ensure that the identities of the pedestrians are not capable of discernment based on analysis of the pedestrian density data 192, even by the entity which operates the pedestrian density system 199.

The gender data 503, age data 504 and other metrics data 505 are depicted with a dashed line in FIG. 5A to indicate that they are optional features of the pedestrian density data 192.

In some embodiments, the gender data 503 is digital data that describes gender variations present among pedestrians at the business (whose geographic area is described by the business GPS data 187) at different days of the week and times of the day [e.g., of the "N" number of pedestrians present at this "B" business at "T" time of day and "D" day of the week, "X" are women and "Y" are men, where N, B, T, D, X and Y are variables in the pedestrian density data].

In some embodiments, the age data 504 is digital data that describes age variations among pedestrians present at the business (whose geographic area is described by the business GPS data 187) at different days of the week and times of the day.

In some embodiments, the other metrics data 505 is digital data that describes, among other metrics, estimations about the parental status of the pedestrians present at the business (whose geographic area is described by the business GPS data 187) at different days of the week and times of the day. This may include, for example, an estimate of whether the pedestrians are a parent of a young child as estimated by whether they are pushing a stroller.

In some embodiments, the other metrics data 505 may describe other metrics determinable based on the PSM data 195. For example, the other metrics data 505 may describe one or more of the following: a distribution of income levels of the pedestrians at the specific geographic location on different days of the week and different times of the day (which may be inferred, for example, based on the type of DSRC-enabled device or other data included in the PSM data 195); and information about the shopping habits or preferences for the pedestrians at the specific geographic location on different days of the week and different times of the day; etc.

Figure 5B:
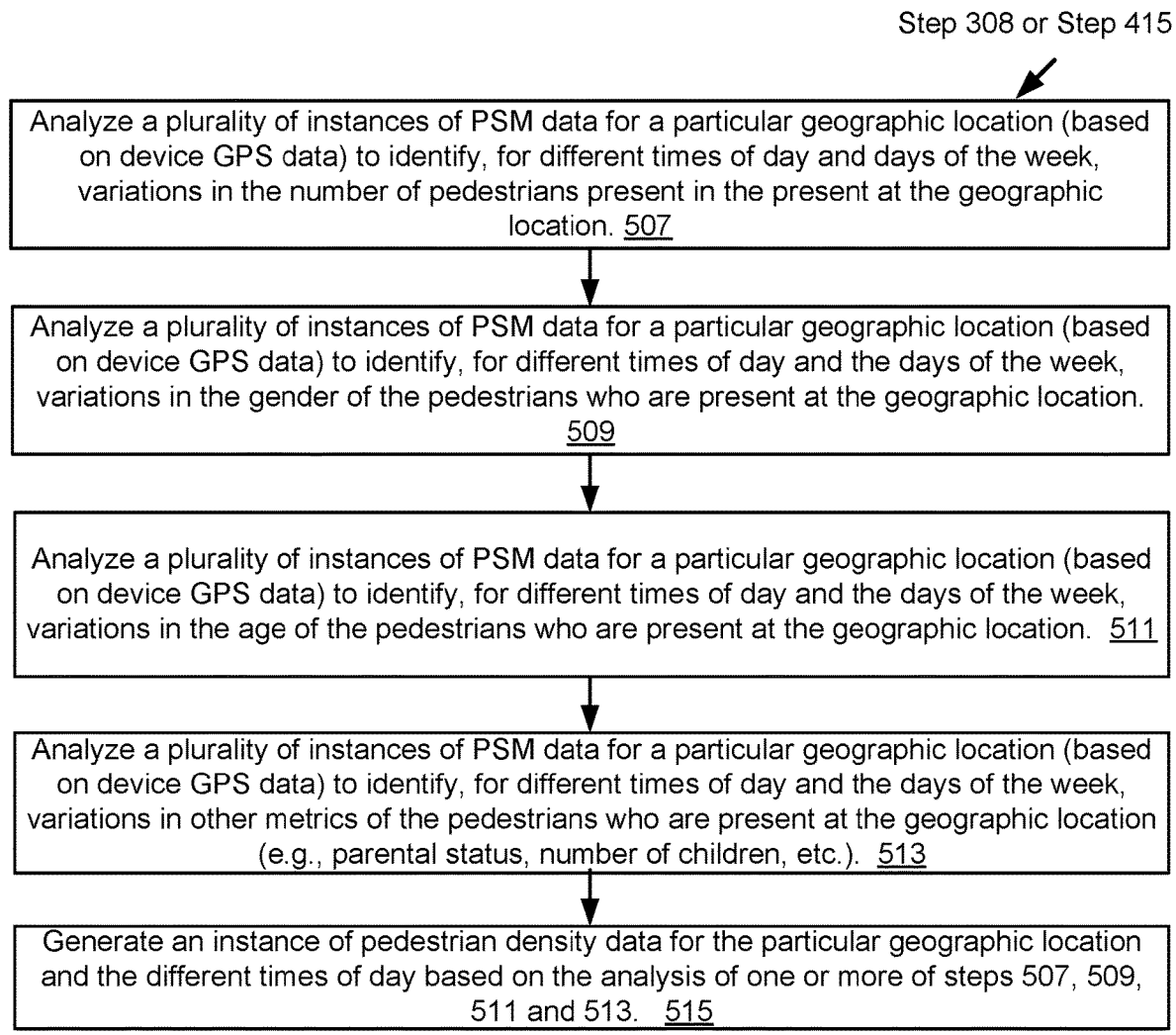
FIG. 5B example flow diagram of a method for analyzing a plurality of instances of PSM data for a particular geographical location described by an instance of device GPS data to generate an instance of pedestrian density data for an instance of business GPS data that includes the particular geographical location described by the instance of device GPS data according to some embodiments.

Referring now to FIG. 5B, depicted is an example flow diagram of a method for executing one or more of steps 308 of FIG. 3A or step 415 of FIG. 4B. In particular, this method includes steps for analyzing a plurality of instances of PSM data for a particular geographical location described by an instance of device GPS data to generate an instance of pedestrian density data for an instance of business GPS data that includes the particular geographical location described by the instance of device GPS data according to some embodiments. The method of FIG. 5B is now described according to some embodiments.

At step 507, analyze a plurality of instances of PSM data for a particular geographic location (based on device GPS data) to identify, for different times of day and days of the week, variations in the number of pedestrians present in the present at the geographic location. Step 507 generates the count data 502 depicted in FIG. 5A.

At step 509, analyze a plurality of instances of PSM data for a particular geographic location (based on device GPS data) to identify, for different times of day and the days of the week, variations in the gender of the pedestrians who are present at the geographic location. Step 509 generates the gender data 503 depicted in FIG. 5A.

At step 511, analyze a plurality of instances of PSM data for a particular geographic location (based on device GPS data) to identify, for different times of day and the days of the week, variations in the age of the pedestrians who are present at the geographic location. Step 511 generates the age data 504 depicted in FIG. 5A.

At step 513, analyze a plurality of instances of PSM data for a particular geographic location (based on device GPS data) to identify, for different times of day and the days of the week, variations in other metrics of the pedestrians who are present at the geographic location (e.g., parental status, number of children, etc.). Step 513 generates the other metrics data 505 depicted in FIG. 5A.

At step 515, generate an instance of pedestrian density data 192 for the particular geographic location and the different times of day based on the analysis of one or more of steps 507, 509, 511 and 513. Step 515 forms the pedestrian density data 192 according to some embodiments.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving, by a first chip of a vehicle to everything (V2X)-enabled vehicle, a pedestrian safety message (a PSM message) including an instance of pedestrian safety message data (PSM data) describing a geographic location of a pedestrian and a time of day and a day of a week when the pedestrian is present at the geographic location;
executing an analysis of the instance of PSM data to determine that the pedestrian is present at a business based on the geographic location being within a known geographic area for the business; and
generating pedestrian density data that describes a density of pedestrians around the business, wherein the pedestrian density data represents the density of pedestrians for different times of day and different days of the week, based on executing the analysis for a plurality of instances of PSM data.

2. The method of claim 1, wherein the pedestrian density data is used to determine shopping habits for the pedestrians at the geographic location on the different times of day and the different days of the week.

3. The method of claim 1, further comprising modifying an electronic roadway map to associate the business with the pedestrian density data.

4. The method of claim 3, wherein the electronic roadway map includes business graphical positioning system data (business GPS data) for a plurality of businesses, the plurality of businesses including the business.

5. The method of claim 1, wherein the PSM message is broadcast by a V2X-enabled device which is carried by the pedestrian and includes a second chip that is operable to broadcast the PSM message for the receiving by the first chip.

6. The method of claim 1, further comprising:
determining that a current geographic location of the V2X-enabled vehicle is within a threshold distance of the geographic location; and
modifying an operation of a set of Advanced Driver Assistance Systems (a set of ADAS systems) of the V2X-enabled vehicle based on the pedestrian density data for the business so that a motion profile of the V2X-enabled vehicle is modified for how many pedestrians are present at the business.

7. The method of claim 1, further comprising:
receiving, by an electronic personal assistant of the V2X-enabled vehicle, a query related to the business; and
responding to the query based at least in part on the pedestrian density data for the business.

8. A system comprising:
a processor and a first chip of a vehicle to everything (V2X)-enabled vehicle communicatively coupled to a non-transitory memory storing executable code which is operable, when executed by the processor, to cause the processor to:
receive, by the first chip, a pedestrian safety message (a PSM message) including an instance of pedestrian safety message data (PSM data) describing a geographic location of a pedestrian and a time of day and a day of a week when the pedestrian is present at the geographic location;
execute an analysis of the instance of PSM data to determine that the pedestrian is present at a business based on the geographic location being within a known geographic area for the business; and
generate pedestrian density data that describes a density of pedestrians around the business, wherein the pedestrian density data represents the density of pedestrians for different times of day and different days of the week, based on executing the analysis for a plurality of instances of PSM data.

9. The system of claim 8, wherein the pedestrian density data is used to determine shopping habits for the pedestrians at the geographic location on the different times of day and the different days of the week.

10. The system of claim 8, wherein the non-transitory memory stores additional executable code which is operable, when executed by the processor, to cause the processor to wirelessly transmit the PSM data to a server which determines the pedestrian density data and wirelessly transmits the pedestrian density data back to the (V2X)-enabled vehicle.

11. The system of claim 8, wherein the non-transitory memory stores additional executable code which is operable, when executed by the processor, to cause the processor to modify an electronic roadway map to associate the business with the pedestrian density data and wherein the electronic roadway map includes business graphical positioning system data (business GPS data) for a plurality of businesses, the plurality of businesses including the business.

12. The system of claim 8, wherein the PSM message is broadcast by a (V2X)-enabled device which is carried by the pedestrian and includes a second DSRC chip that is operable to broadcast the PSM message for receipt by the first chip.

13. The system of claim 8, wherein the non-transitory memory stores additional executable code which is operable, when executed by the processor, to cause the processor to:
determine that a current geographic location of the (V2X)-enabled vehicle is within a threshold distance of the geographic location; and
modify an operation of a set of Advanced Driver Assistance Systems (a set of ADAS systems) of the (V2X)-enabled vehicle based on the pedestrian density data for the business so that a motion profile of the (V2X)-enabled vehicle is modified for how many pedestrians are present at the business.

14. The system of claim 8, wherein the non-transitory memory stores additional executable code which is operable, when executed by the processor, to cause the processor to:
receive, by an electronic personal assistant of the (V2X)-enabled vehicle, a query related to the business; and
respond to the query based at least in part on the pedestrian density data for the business.

15. A computer program product comprising a non-transitory memory of an onboard vehicle computer system of a vehicle to everything (V2X) (a (V2X)-enabled vehicle)

storing computer-executable code that, when executed by the onboard vehicle computer system, causes the onboard vehicle computer system to:

receive, by a first chip of a (V2X)-enabled vehicle, a pedestrian safety message (a PSM message) including an instance of pedestrian safety message data (PSM data) describing a geographic location of a pedestrian and a time of day and a day of a week when the pedestrian is present at the geographic location;

execute an analysis of the instance of PSM data to determine that the pedestrian is present at a business based on the geographic location being within a known geographic area for the business; and generate pedestrian density data that describes a density of pedestrians around the business, wherein the pedestrian density data represents the density of pedestrians for different times of day and different days of the week, based on executing the analysis for a plurality of instances of PSM data.

16. The computer program product of claim 15, wherein the pedestrian density data is used to determine shopping habits for the pedestrians at the geographic location on the different times of day and the different days of the week.

17. The computer program product of claim 15, wherein the non-transitory memory stores additional computer-executable code which is operable, when executed by the onboard vehicle computer system, to cause the onboard vehicle computer system to wirelessly transmit the PSM data to a server which determines the pedestrian density data and wirelessly transmits the pedestrian density data back to the (V2X)-enabled vehicle.

18. The computer program product of claim 15, wherein the PSM message is broadcast by a DSRC-enabled device which is carried by the pedestrian and includes a second DSRC chip that is operable to broadcast the PSM message for receipt by the first chip.

19. The computer program product of claim 15, wherein the non-transitory memory stores additional computer-executable code which is operable, when executed by the onboard vehicle computer system, to cause the onboard vehicle computer system to:

determine that a current geographic location of the (V2X)-enabled vehicle is within a threshold distance of the geographic location; and modify an operation of a set of Advanced Driver Assistance Systems (a set of ADAS systems) of the (V2X)-enabled vehicle based on the pedestrian density data for the business so that a motion profile of the (V2X)-enabled vehicle is modified for how many pedestrians are present at the business.

20. The computer program product of claim 15, wherein the non-transitory memory stores additional computer-executable code which is operable, when executed by the onboard vehicle computer system, to cause the onboard vehicle computer system to:

receive, by an electronic personal assistant of the (V2X)-enabled vehicle, a query related to the business; and respond to the query based at least in part on the pedestrian density data for the business.

* * * * *